United States Patent
Yoon et al.

(10) Patent No.: US 12,360,642 B2
(45) Date of Patent: Jul. 15, 2025

(54) DISPLAY DEVICE

(71) Applicant: Samsung Display Co., Ltd., Yongin-Si (KR)

(72) Inventors: Sang Rock Yoon, Hwaseong-si (KR); Ki Seo Kim, Yongin-si (KR); Eun Jin Sung, Yongin-si (KR); Seung Wook Chun, Daegu (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/433,442

(22) Filed: Feb. 6, 2024

(65) Prior Publication Data

US 2024/0211084 A1     Jun. 27, 2024

Related U.S. Application Data

(63) Continuation of application No. 18/111,918, filed on Feb. 21, 2023, now Pat. No. 11,899,893, which is a
(Continued)

(30) Foreign Application Priority Data

Dec. 24, 2021 (KR) .................. 10-2021-0186777

(51) Int. Cl.
  *G06F 3/044*   (2006.01)
  *G06F 3/041*   (2006.01)
  (Continued)

(52) U.S. Cl.
  CPC .......... *G06F 3/0446* (2019.05); *G06F 3/0412* (2013.01); *H01Q 1/243* (2013.01); *H01Q 1/38* (2013.01)

(58) Field of Classification Search
  None
  See application file for complete search history.

(56) References Cited

U.S. PATENT DOCUMENTS

2010/0245266 A1* 9/2010 Tonouchi .............. G06F 3/0416
                                                                382/187
2012/0092284 A1* 4/2012 Rofougaran ........... G06F 3/017
                                                                345/173
(Continued)

FOREIGN PATENT DOCUMENTS

KR    10-1409914 B1    6/2014
KR    10-2099753 B1    4/2020
(Continued)

OTHER PUBLICATIONS

Sung-Wook Kang, Min-Ho Jang, Seongwook Lee, Identification of Human Motion Using Radar Sensor in an Indoor Environment, Publisher MDPI, published Mar. 25, 2021, Sensors, vol. Issues 2021, 21, 2305, 17 pages.

Primary Examiner — Nicholas J Lee
(74) Attorney, Agent, or Firm — Innovation Counsel LLP

(57) ABSTRACT

A display device is provided. The display device comprise a substrate a display layer disposed on the substrate and including a plurality of light-emitting areas, and a touch layer disposed on the display layer and including a touch area and a non-touch area, the touch layer includes: a plurality of first sensor electrodes and a plurality of second sensor electrodes disposed in the touch area, and a plurality of antenna patterns disposed in a portion of the touch area disposed adjacent to the non-touch area, the plurality of antenna patterns includes: a first antenna pattern transmitting a transmit signal, and a second antenna pattern receiving the transmit signal, wherein each of the first antenna pattern and the second antenna pattern is at least partially surrounded by one of the plurality of first sensor electrodes or one of the plurality of second sensor electrodes in a plan view.

15 Claims, 19 Drawing Sheets

Related U.S. Application Data continuation of application No. 17/858,598, filed on Jul. 6, 2022, now Pat. No. 11,609,673.

(51) Int. Cl.
*H01Q 1/24* (2006.01)
*H01Q 1/38* (2006.01)

(56) References Cited

U.S. PATENT DOCUMENTS

| | | |
|---|---|---|
| 2013/0162517 A1* | 6/2013 | Gay ................. G01S 13/04 345/156 |
| 2015/0084922 A1 | 3/2015 | Park et al. |
| 2017/0131395 A1* | 5/2017 | Reynolds ............ G01S 13/56 |
| 2018/0018053 A1 | 1/2018 | No et al. |
| 2019/0131572 A1 | 5/2019 | Gwon et al. |
| 2021/0103354 A1 | 4/2021 | Kim et al. |
| 2021/0104582 A1 | 4/2021 | Kim et al. |

FOREIGN PATENT DOCUMENTS

| | | |
|---|---|---|
| KR | 10-2020-0143628 A | 12/2020 |
| KR | 10-2021-0041156 A | 4/2021 |
| KR | 10-2021-0042202 A | 4/2021 |

* cited by examiner

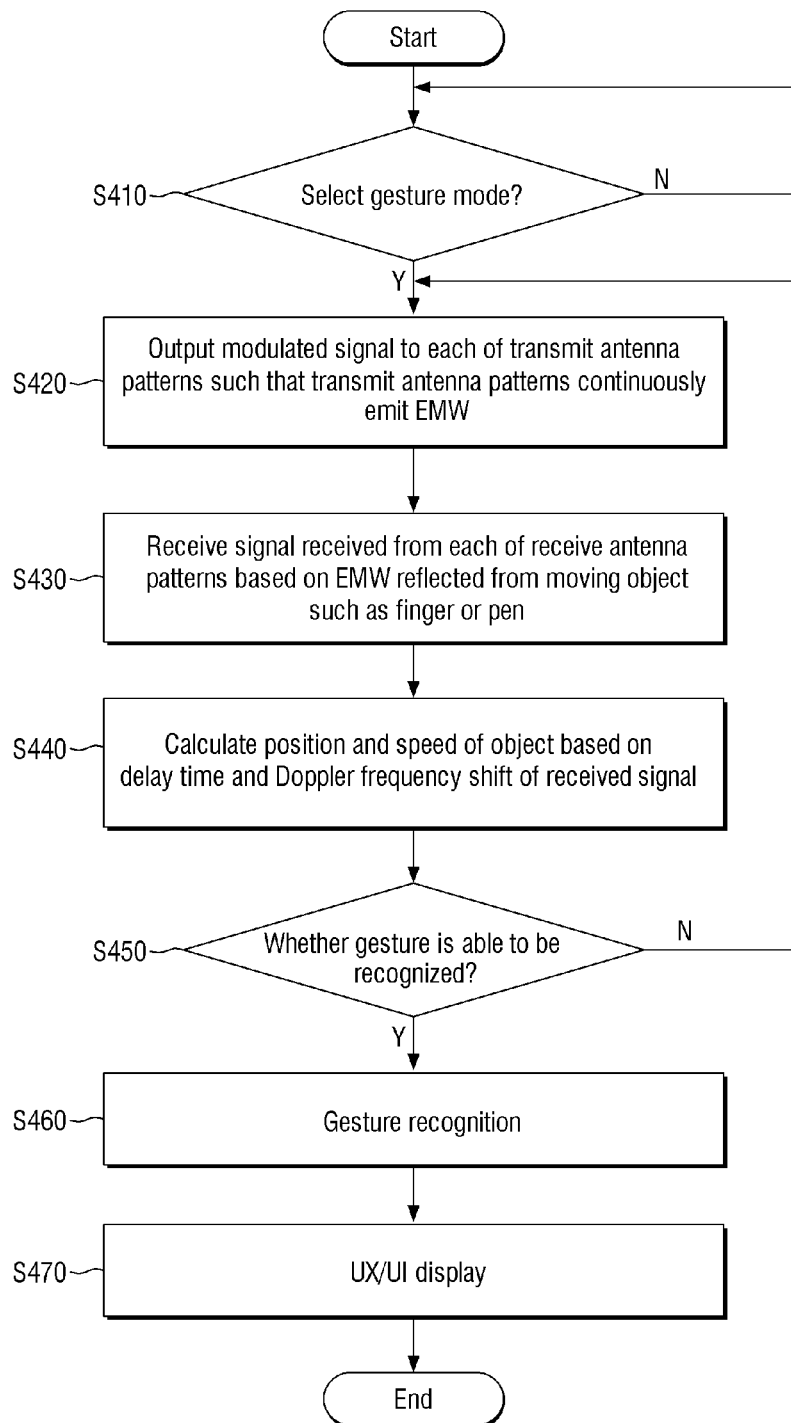

DISPLAY DEVICE

CROSS-REFERENCE TO RELATED APPLICATION

This application is a continuation application of U.S. patent application Ser. No. 18/111,918, filed on Feb. 21, 2023, which is a continuation application of U.S. patent application Ser. No. 17/858,598 filed on Jul. 6, 2022, now U.S. Pat. No. 11,609,673, which claims priority to Korean Patent Application No. 10-2021-0186777 filed on Dec. 24, 2021, in the Korean Intellectual Property Office, and all the benefits accruing therefrom under 35 U.S.C. 119, the contents of which in its entirety are herein incorporated by reference.

BACKGROUND

1. Field

The disclosure relates to a display device.

2. Description of Related Art

As the information society develops, the demand for display devices for displaying images is increasing in various forms. For example, display devices are being applied to various electronic devices such as smart phones, digital cameras, notebook computers, navigation devices, and smart televisions.

Further, the display device may include an antenna that transmits/receives wireless electromagnetic waves for wireless communication. For example, the display device may include an antenna for 4G mobile communication such as LTE (Long Term Evolution) and 5G mobile communication. Therefore, when a touch sensor operates in a capacitive scheme to detect a user's touch, it is difficult for the touch sensor to recognize a gesture of a user close to the display device.

SUMMARY

A purpose of the disclosure is to provide a display device capable of recognizing a gesture close to a display device.

Purposes according to the disclosure are not limited to the above-mentioned purpose. Other purposes and advantages according to the disclosure that are not mentioned may be understood based on following descriptions, and may be more clearly understood based on embodiments according to the disclosure. Further, it will be easily understood that the purposes and advantages according to the disclosure may be realized using means shown in the claims and combinations thereof.

According to an embodiment of the disclosure, a display device comprise a substrate a display layer disposed on the substrate, and including a plurality of light-emitting areas, and a touch layer disposed on the display layer and including a touch area and a non-touch area disposed on one side of the touch area, the touch layer includes: a plurality of first sensor electrodes and a plurality of second sensor electrodes disposed in the touch area, and a plurality of antenna patterns disposed in a portion of the touch area disposed adjacent to the non-touch area, the plurality of antenna patterns includes: a first antenna pattern transmitting a transmit signal, and a second antenna pattern receiving the transmit signal, and wherein each of the first antenna pattern and the second antenna pattern is at least partially surrounded by one of the plurality of first sensor electrodes or one of the plurality of second sensor electrodes in a plan view.

The plurality of antenna patterns may further include a third antenna pattern disposed in the portion of the touch area disposed adjacent to the non-touch area or in the non-touch area, the third antenna pattern transmits or receives a communication signal.

The touch layer may further include a plurality of dummy holes surrounded by the plurality of first sensor electrodes or the plurality of second sensor electrodes, wherein each of the first antenna pattern and the second antenna pattern is disposed in one of the plurality of dummy holes, respectively, and is spaced apart from the plurality of first sensor electrodes and the plurality of second sensor electrodes.

The plurality of first sensor electrodes and the plurality of second sensor electrodes do not overlap the plurality of light-emitting areas.

The first antenna pattern includes a plurality of first antenna patterns and the second antenna pattern includes a plurality of second antenna patterns. The device may further comprise a plurality of antenna feed lines, the plurality of antenna feed lines including a plurality of first antenna feed lines connected to the plurality of first antenna patterns in one-to-one manner, and a plurality of second antenna feed lines connected to the plurality of second antenna patterns in one-to-one manner.

The first antenna pattern may transmit the transmit signal via the first antenna feed line, and the second antenna pattern receives the transmit signal via the second antenna feed line.

Each of the first antenna feed line and the second antenna feed line may overlap the first sensor electrode in a plan view.

The first antenna feed line and the second antenna feed line nay be disposed in a non-display area.

The touch layer may further include an insulating layer for electrically insulating the plurality of first sensor electrodes and the plurality of second sensor electrodes from the plurality of antenna patterns, each of the plurality of antenna patterns is connected to each of the plurality of antenna feed lines via a contact hole formed in the insulating layer, respectively.

The device may further comprise a plurality of capacitor electrode patterns disposed on the touch layer, wherein the plurality of capacitor electrode patterns overlap the plurality of antenna patterns in a plan view and are connected to the plurality of antenna feed lines.

BRIEF DESCRIPTION OF DRAWINGS

The above and other aspects and features of the disclosure will become more apparent by describing in detail embodiments thereof with reference to the attached drawings, in which:

FIG. 19 is a flowchart showing a gesture sensing method according to another embodiment.

DETAILED DESCRIPTIONS

Figure 1:
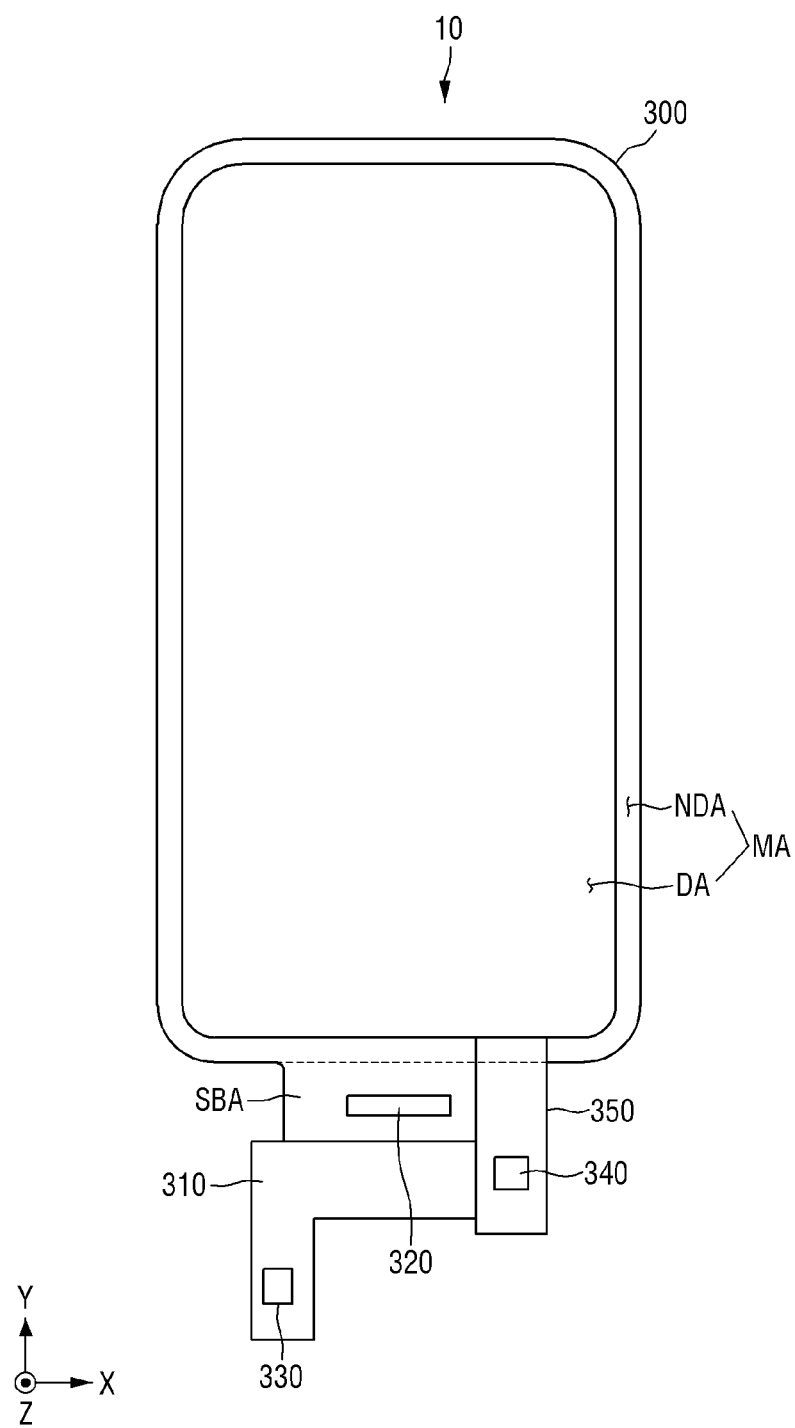
FIG. 1 is a schematic plan view of a display device according to one embodiment.

For simplicity and clarity of illustration, elements in the drawings are not necessarily drawn to scale. The same reference numbers in different drawings are the same or similar elements, and as such perform similar functionality. Further, descriptions and details of well-known steps and elements are omitted for simplicity of the description. Furthermore, in the following detailed description of the disclosure, numerous specific details are set forth in order to provide a thorough understanding of the disclosure. However, it will be understood that the disclosure may be practiced without these specific details. In other instances, well-known methods, procedures, components, and circuits have not been described in detail so as not to unnecessarily obscure aspects of the disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the disclosure as defined by the appended claims.

A shape, a size, a ratio, an angle, a number, etc. disclosed in the drawings for describing an embodiments of the disclosure are exemplary, and the disclosure is not limited thereto. The same reference numerals refer to the same elements herein. Further, descriptions and details of well-known steps and elements are omitted for simplicity of the description. Furthermore, in the following detailed description of the disclosure, numerous specific details are set forth in order to provide a thorough understanding of the disclosure. However, it will be understood that the disclosure may be practiced without these specific details. In other instances, well-known methods, procedures, components, and circuits have not been described in detail so as not to unnecessarily obscure aspects of the disclosure.

The terminology used herein is for the purpose of describing particular embodiments only and is not intended to limit the disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the disclosure.

In addition, it will also be understood that when a first element or layer is referred to as being "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain embodiment may be implemented differently, a function or operation specified in a specific block may occur in a sequence different from that specified in a flowchart. For example, two consecutive blocks may actually be executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various embodiments of the disclosure may be partially or entirely combined with each other, and may be technically associated with each other or operate with each other. The embodiments may be implemented independently of each other and may be implemented together in an association relationship. Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, when the device in the drawings is turned over, elements described as "below" or "beneath" or "under" other elements or features would then be oriented "above" the other elements or features. Thus, the example terms "below" and "under" may encompass both an orientation of above and below. The device may be otherwise oriented for example, rotated 90 degrees or at other orientations, and the spatially relative descriptors used herein should be interpreted accordingly.

Hereinafter, specific embodiments will be described with reference to the accompanying drawings.

FIG. 1 is a plan view showing a display device according to one embodiment.

Referring to FIG. 1, a display device 10 according to one embodiment may be applied to a portable electronic device such as a mobile phone, a smart phone, a tablet PC (tablet personal computer), a mobile communication terminal, an electronic notebook, an electronic book, PMP (portable multimedia player), navigation, UMPC (Ultra Mobile PC), etc. Alternatively, the display device 10 according to one embodiment may be applied to a television, a laptop computer, a monitor, a billboard, or the Internet of Things (IoT). Alternatively, the display device 10 according to one embodiment may be applied to a wearable device such as a smart watch, a watch phone, a glasses type display, and a head mounted display (HMD). Alternatively, the display device 10 according to one embodiment may be applied to a vehicle's dashboard, a center fascia of the vehicle, a CID (Center Information Display) disposed on the dashboard of the vehicle, a room mirror display that replaces a side mirror of the vehicle, or a display disposed on a back face of a front seat as entertainment for a rear seat of the vehicle.

In the drawing, a first direction X is a direction parallel to one side of the display device 10 in a plan view, and refers to a direction of a short side of the display device 10. The second direction Y is a direction parallel to the other side in contact with the one side of the display device 10 in the plan view, and refers to a direction of a long side of the display device 10. The third direction Z refers to a thickness direction of display device 10. However, it should be understood that the direction mentioned in the embodiment means a relative direction, and the embodiment is not limited to the mentioned direction.

The display device 10 may be formed in a planar shape similar to a rectangle. For example, the display device 10 may have a planar shape similar to a rectangle having a short side extending in the first direction (X-axis direction) and a long side extending in the second direction (Y-axis direction) as shown in FIG. 1. A corner where the short side of the first direction (X-axis direction) and the long side of the second direction (Y-axis direction) meet each other may be rounded to have a predefined curvature or may be formed at a right angle. The planar shape of the display device 10 is not limited to a quadrangle, and may be formed in other polygons, a circle, or an oval.

The display device 10 according to one embodiment includes a display panel 300, a display circuit board 310, a display driving circuit 320, a touch driving circuit 330, an antenna driving circuit 340, and an antenna circuit board 350.

The display panel 300 may be a light-emitting display panel including a light-emitting element. For example, the display panel 300 may be embodied as an organic light-emitting display panel using an organic light-emitting diode including an organic light-emitting layer, a micro light-emitting diode display panel using a micro light-emitting diode (micro LED), a quantum dot light-emitting display panel using a quantum dot light-emitting element including a quantum dot light-emitting layer, or an inorganic light-emitting display panel using an inorganic light-emitting element including an inorganic semiconductor.

The display panel 300 may be a rigid display panel that is not easily bent because it has rigidity or may be a flexible display panel that may be easily bent, folded, or rolled because it is flexible. For example, the display panel 300 may be embodied as a foldable display panel that may be folded and unfolded, a curved display panel with a curved display surface, a bended display panel with a curved area other than a display face, a rollable display panel that may be rolled or unrolled, and a stretchable display panel that may be stretchable.

The display panel 300 may include a main-area MA and a sub-area SBA protruding from one side of the main-area MA.

The main-area MA may include a display area DA that displays an image and a non-display area NDA that is an area surrounding the display area DA. The display area DA may occupy a substantial portion of the main-area MA. The display area DA may be disposed in an inner region of the main-area MA. The non-display area NDA may be an area surrounding the display area DA. The non-display area NDA may be defined as an edge area of the display panel 300.

Figure 2:
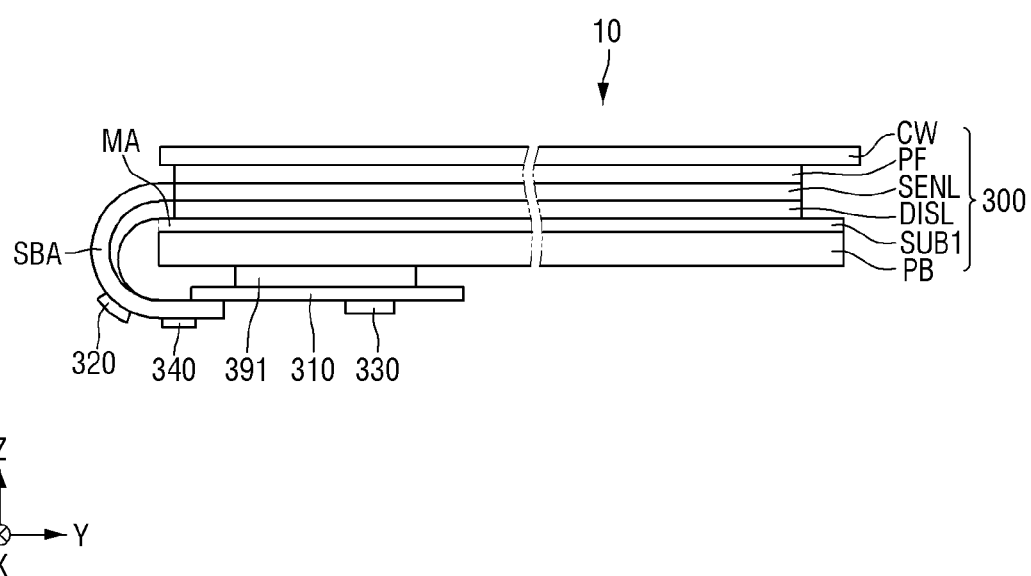
FIG. 2 is a cross-sectional view showing a display device according to one embodiment.

The sub-area SBA may protrude from one side of the main-area MA in the second direction (Y-axis direction). As shown in FIG. 2, a length in the first direction (X-axis direction) of the sub-area SBA may be smaller than a length in the first direction (X-axis direction) of the main-area MA, and a length in the second direction (Y-axis direction) of the sub-area SBA may be smaller than a length in the second direction (Y-axis direction) of the main-area MA. However, the disclosure is not limited thereto. The sub-area SBA may be bent and disposed on a rear surface of the display panel 300 as shown in FIG. 2. The sub-area SBA may overlap the main-area MA in the third direction (Z-axis direction).

The sub-area SBA of the display panel 300 may be bent and may be disposed under the display panel 300 as shown in FIG. 2. In this case, the sub-area SBA of the display panel 300 may overlap the main-area MA of the display panel 300 in the third direction (Z-axis direction).

The display circuit board 310 may be attached to the sub-area SBA of the display panel 300. The display circuit board 310 may be attached on pads of the sub-area SBA of the display panel 300 using a low-resistance and high-reliability material such as an anisotropic conductive film or SAP (Self Assembly Anisotropic Conductive Paste). The display circuit board 310 may be a flexible printed circuit board (FPCB) that may be bent, a rigid printed circuit board (PCB) which may be rigid and thus may not be bent, or a hybrid printed circuit board that includes the rigid printed circuit board and the flexible printed circuit board.

The display driving circuit 320 may be disposed on the sub-area SBA of the display panel 300. The display driving circuit 320 may receive control signals and power voltages, and may generate and output signals and voltages for driving the display panel 300. The display driving circuit 320 may be composed of an integrated circuit (IC).

The touch driving circuit 330 may be disposed on the display circuit board 310. The touch driving circuit 330 may be embodied as an integrated circuit. The touch driving circuit 330 may be attached to the display circuit board 310.

The touch driving circuit 330 may be electrically connected to sensor electrodes of a sensor layer of the display panel 300 via the display circuit board 310. Therefore, the touch driving circuit 330 may output a touch drive signal to each of the sensor electrodes, and sense a voltage charged in a mutual capacitance of the sensor electrodes. Description of the sensor electrodes of the sensor layer will be made later in conjunction with FIG. 4.

The touch driving circuit 330 generates touch data according to a change in an electrical signal sensed by each of the sensor electrodes and transmits the generated touch data to a main processor. The main processor analyzes the touch data to calculate touch coordinates at which a touch of an object occurs. The touch driving circuit 330 may receive a sensed electrical signal of the contact touch. The contact touch refers to direct contact of an object such as a human finger or a pen with a cover window disposed on the sensor layer.

The antenna circuit board 350 may be attached to the main-area MA of the display panel 300. The antenna circuit board 350 may be attached on the antenna pads of the main-area MA of the display panel 300 using a low-resistance and high-reliability material such as an anisotropic conductive film or SAP.

The antenna circuit board 350 may be a flexible printed circuit board that may be bent or a flexible film such as a chip on film. The antenna circuit board 350 may be bent and disposed under the display panel 300. Further, FIG. 1 illustrates that the antenna circuit board 350 is disposed below the display panel 300. However, the disclosure is not limited thereto. The antenna circuit board 350 may be disposed on a left or right side of the display panel 300.

The antenna driving circuit 340 may be disposed on the antenna circuit board 350. The antenna driving circuit 340 may be electrically connected to the antenna patterns of the sensor layer of the display panel 300 via the antenna circuit board 350. Therefore, the antenna driving circuit 340 may receive a radio frequency signal received by the antenna patterns AP and output a radio frequency signal to be transmitted to the antenna patterns. The antenna driving circuit 340 may be composed of an integrated circuit (IC).

The description of the antenna patterns of the sensor layer will be described later in conjunction with FIG. 4.

The antenna driving circuit 340 may process a transmit signal generated from a host to generate an antenna transmit signal ATX and provide the antenna transmit signal ATX to the transmit antenna pattern TAP. The antenna driving circuit 340 may receive an antenna receive signal ARX received from a receive antenna pattern RAP and may provide the antenna receive signal to the host. For example, the antenna driving circuit 340 may include a transmitter. The transmitter may include a filter, a mixer, and a power amplifier (PA). Further, the antenna driving circuit 340 may include a receiver. The receiver may include a filter, mixer, a low noise amplifier (LNA).

The antenna driving circuit 340 may process a radio frequency signal transmitted/received to/from the antenna patterns AP. For example, the antenna driving circuit 340 may change an amplitude of the radio frequency signal received by the antenna patterns. Alternatively, the antenna driving circuit 340 may change a phase as well as the amplitude of the radio frequency signal received by the antenna patterns AP. The antenna driving circuit 340 may transmit the processed radio frequency signal to a mobile communication module.

Further, the antenna driving circuit 340 may change an amplitude of a radio frequency signal transmitted from the mobile communication module. Alternatively, the antenna driving circuit 340 may change a phase as well as the amplitude of the radio frequency signal transmitted from the mobile communication module. The antenna driving circuit 340 may transmit the processed radio frequency signal to the antenna patterns AP.

Further, the antenna driving circuit 340 may recognize gestures based on an electrical signal transmitted/received to/from the transmit and receive antenna patterns TAP and RAP. Gesture recognition refers to an interpretation of human gestures to identify a location of an object such as a person's finger or a pen close to the cover window and to recognize a movement of the object as in a hovering operation. A description thereof will be described later.

FIG. 2 is a cross-sectional view showing a display device according to one embodiment.

Referring to FIG. 2, the display panel 300 may include a first substrate SUB1, a display layer DISL, a sensor layer SENL, a polarizing film PF, a cover window CW and a panel lower cover PB.

The first substrate SUB1 may be made of an insulating material such as glass, quartz, or polymer resin. The first substrate SUB1 may be a flexible substrate capable of bending, folding, rolling, etc.

The display layer DISL may be disposed on the main-area MA of the first substrate SUB1. The display layer DISL may be a layer including a light-emitting area for displaying an image. The display layer DISL may include a thin-film transistor layer in which thin-film transistors are formed, a light-emitting element layer in which light-emitting elements are disposed in light-emitting areas, and an encapsulation layer for encapsulating the light-emitting element layer.

In a display area DA of the display layer DISL, the light-emitting areas, and scan lines, data lines, power lines, etc. for driving the light-emitting elements may be disposed. In a non-display area NDA of the display layer DISL, a scan driver for outputting scan signals to the scan lines, and fan-out lines connecting the data lines to the display driving circuit 320 may be disposed.

The sensor layer SENL may be disposed on the display layer DISL. The sensor layer SENL may include sensor electrodes. The sensor layer SENL may be a layer that senses touch using the sensor electrodes.

Further, the sensor layer SENL includes an antenna pattern AP. The antenna pattern AP may include a communication antenna pattern AAP and the transmit and receive antenna patterns TAP and RAP. The sensor layer SENL may transmit/receive a communication frequency signal using the communication antenna patterns AAP. Further, the sensor layer SENL may recognize the user's gesture using the transmit and receive antenna patterns TAP and RAP.

The polarizing film PF may be disposed on the sensor layer SENL. The polarizing film PF may include a first base film, a linear polarizing plate, a phase retardation film such as a λ/4 plate (quarter-wave plate), and a second base film. The first base film, the phase retardation film, the linear polarizing plate, and the second base film may be sequentially stacked on the sensor layer SENL.

The cover window CW may be disposed on the polarizing film PF. The cover window may be attached on the polarizing film PF via a transparent adhesive member such as an OCA (optically clear adhesive) film.

The panel lower cover PB may constitute a bottom portion of the display panel 300. The panel lower cover PB may be attached to a bottom face of the display panel 300 via an adhesive member. The adhesive member may be a pressure sensitive adhesive (PSA). The panel lower cover PB may include at least one of a light blocking layer for absorbing light incident from an outside, an impact absorbing layer for absorbing an impact from the outside, and a heat dissipation layer for efficiently dissipating heat of the display panel 300.

The impact absorbing layer may be disposed under the light blocking layer. The impact absorbing layer absorbs external shocks and prevents the display panel 300 from being damaged. The impact absorbing layer may be composed of a single layer or a plurality of layers. For example, the impact absorbing layer may be made of a polymer resin such as polyurethane, polycarbonate, polypropylene, polyethylene, etc. or may be made of a material having elasticity, such as rubber, a urethane-based material, or a sponge produced by foam-forming an acrylic-based material.

The heat dissipation layer may be disposed under the impact absorbing layer. The heat dissipation layer may include a first heat dissipation layer including graphite or carbon nanotubes, and a second heat dissipation layer composed of a metal thin-film made of, for example, copper, nickel, ferrite, and silver that may shield electromagnetic waves and has excellent thermal conductivity.

The sub-area SBA of the first substrate SUB1 may be bent and disposed under the display panel 300. The sub-area SBA of the first substrate SUB1 may be attached to a bottom face of the panel lower cover PB via an adhesive layer 391.

Further, the antenna circuit board 350 may be attached to a top face of the first substrate SUB1 using a low-resistance and high-reliability material such as an anisotropic conductive film or SAP. The antenna circuit board 350 may be bent and disposed under the display panel 300. The antenna circuit board 350 may be attached to a bottom face of the panel lower cover PB via the adhesive layer 392. Each of the adhesive layers 391 and 392 may be a pressure sensitive adhesive.

Figure 3:
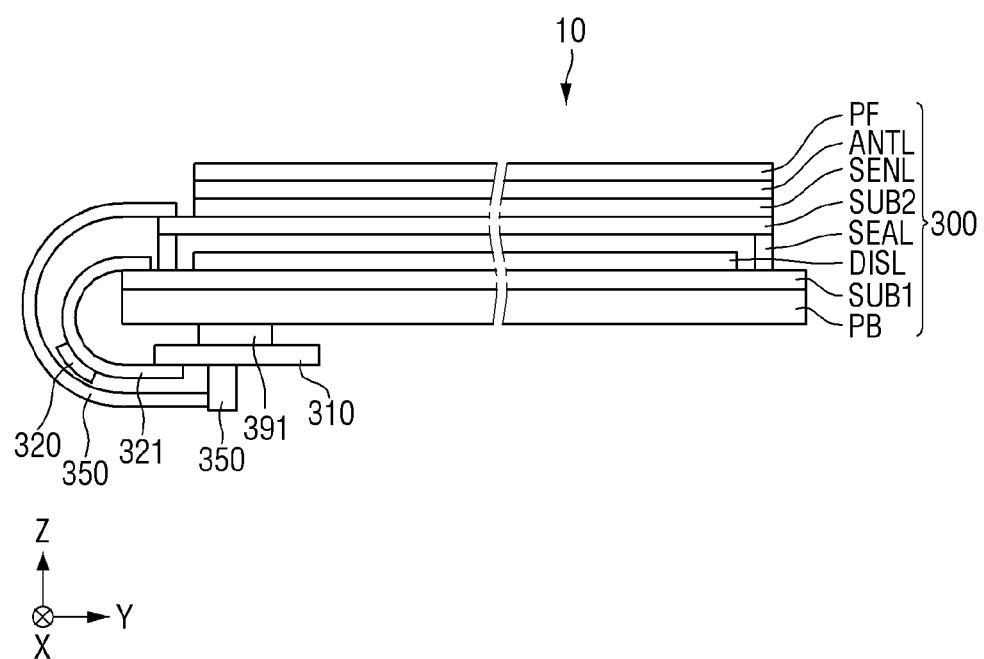
FIG. 3 is a cross-sectional view showing a display device according to another embodiment.

FIG. 3 is a cross-sectional view showing a display device according to another embodiment.

Referring to FIG. 3, the display panel 300 may include a first substrate SUB1, a display layer DISL, an adhesive layer SEAL, a second substrate SUB2, a sensor layer SENL, an antenna layer ANTL, a polarizing film PF, and a panel lower cover PB.

The adhesive layer SEAL may bond the first substrate SUB1 and the second substrate SUB2 to each other. The adhesive layer SEAL may be disposed on an edge of each of the first substrate SUB1 and the second substrate SUB2 so as to surround the display layer DISL. The adhesive layer SEAL may be made of a frit adhesive layer, an ultraviolet curable resin, or a thermosetting resin. However, the disclosure is not limited thereto.

The second substrate SUB2 may be made of an insulating material such as glass, quartz, or polymer resin. The second substrate SUB2 may be a rigid substrate or a flexible substrate capable of bending, folding, rolling, etc.

The sensor layer SENL may be disposed on the second substrate SUB2. The sensor layer SENL may include sensor electrodes. The sensor layer SENL may sense touch using the sensor electrodes.

The antenna layer ANTL may be disposed on the sensor layer SENL. Further, the antenna layer ANTL may include the communication antenna pattern AAP and the transmit and receive antenna patterns TAP and RAP. The antenna layer ANTL may be configured for transmitting/receiving radio frequency signals using the communication antenna patterns AAP and for recognizing the user's gesture using the transmit antenna patterns TAP and the receive antenna patterns RAP.

The polarizing film PF may be disposed on the antenna layer ANTL. The polarizing film PF may include a first base film, a linear polarizing plate, a phase retardation film such as a λ/4 plate (quarter-wave plate), and a second base film. The first base film, the phase delay film, the line polarizing plate, and the second base film may be sequentially stacked on the sensor layer SENL.

Alternatively, the sensor layer SENL and the polarizing film PF may be integrally formed with each other. For example, the sensor layer SENL may be disposed on the first base film of the polarizing film PF. In this case, the first base film, the sensor layer SENL, the phase retardation film, the linear polarizing plate, and the second base film may be sequentially stacked on the second substrate SUB2.

The sensor layer SENL may be disposed on the display layer DISL as shown in FIG. 2 or disposed on the second substrate SUB2 as shown in FIG. 3. Hereinafter, for convenience of description, the description has been mainly focused on an example in which the sensor layer SENL is disposed on the display layer DISL.

Figure 4:
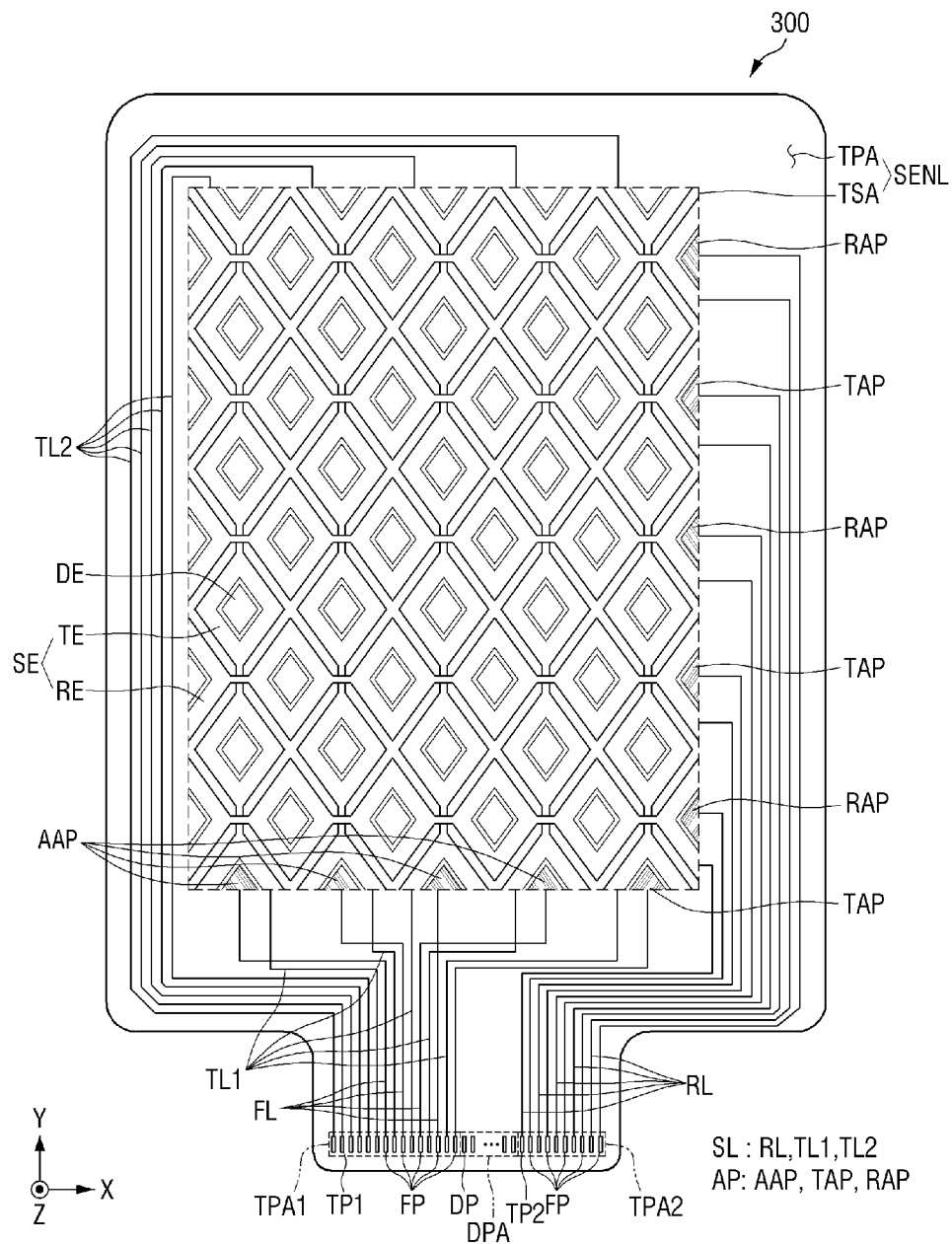
FIG. 4 is a layout diagram showing components of a sensor layer of the display device according to one embodiment.
Figure 5:
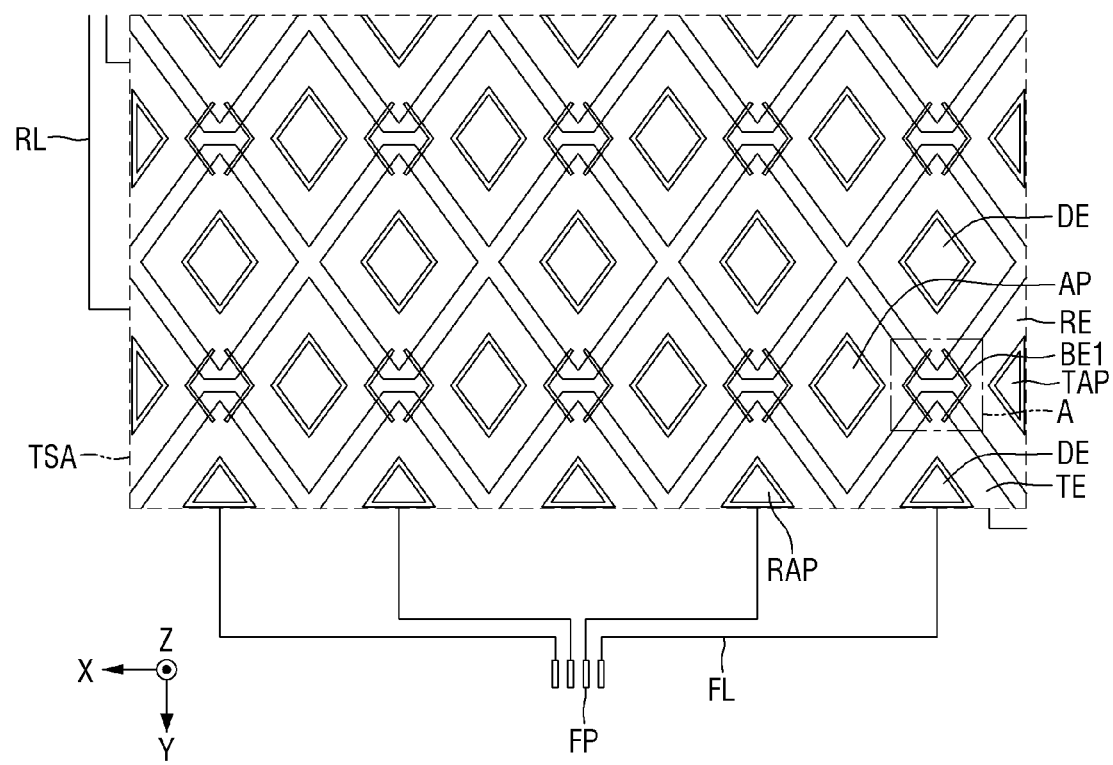
FIG. 5 is a layout diagram showing driving electrodes, sensing electrodes, dummy electrodes, and antenna patterns according to one embodiment.

FIG. 4 is a layout diagram showing components of the sensor layer of the display device according to one embodiment. FIG. 5 is a layout diagram showing driving electrodes, sensing electrodes, dummy electrodes, and antenna patterns according to one embodiment.

In FIG. 4 and FIG. 5, for convenience of illustration, only sensor electrodes TE and RE, dummy patterns DE, antenna patterns AP, sensor lines TL1, TL2 and RL, antenna feed lines FL, sensor pads TP1 and TP2, and antenna pads FP are shown.

Referring to FIG. 4 and FIG. 5, the sensor layer SENL includes a touch sensor area TSA for detecting the user's touch and a touch peripheral area TPA disposed around the touch sensor area TSA. The touch sensor area TSA may overlap the display area DA of the display layer DISL, and the touch peripheral area TPA may overlap the non-display area NDA of the display layer DISL.

The touch sensor area TSA may include the sensor electrodes SE, the dummy patterns DE, the communication antenna pattern AAP and the transmit and receive antenna patterns TAP and RAP. The sensor electrodes SE, for example, the driving electrodes TE and the sensing electrodes RE may form a mutual capacitance and the touch driving circuit 330 may sense the touch of an object or a person. The communication antenna patterns AAP may be patterns for transmitting/receiving radio frequency signals, and the transmit and receive antenna patterns TAP and RAP may be patterns for transmitting/receiving signals for gesture recognition.

The sensor electrodes SE may include driving electrodes TE and sensing electrodes RE. The sensing electrode RE may be defined as a first sensor electrode, while the driving electrode TE may be defined as a second sensor electrode. In this case, the sensing line RL may be defined as a first sensor line, while the first driving line TL1 and the second driving line TL2 may be defined as the second sensor line. Alternatively, the driving electrode TE may be defined as the first sensor electrode, while the sensing electrode RE may be defined as the second sensor electrode. In this case, the first driving line TL1 and the second driving line TL2 may be defined as the first sensor line, while the sensing line RL may be defined as the second sensor line.

The sensing electrodes RE may be arranged side by side in each of the first direction (X-axis direction) and the second direction (Y-axis direction). The sensing electrodes RE may be electrically connected to each other in the first direction (X-axis direction). The sensing electrodes RE adjacent to each other in the first direction (X-axis direction) may be connected to each other. The sensing electrode Res adjacent to each other in the second direction (Y-axis direction) may be electrically isolated from each other.

The driving electrodes TE may be arranged side by side in each of the first direction (X-axis direction) and the second direction (Y-axis direction). The driving electrodes TE adjacent to each other in the first direction (X-axis direction) may be electrically isolated from each other. The driving electrodes TEs may be electrically connected to each other in the second direction (Y-axis direction). The driving electrodes TE adjacent to each other in the second direction (Y-axis direction) may be connected to each other via a first connector BE1.

The first connector BE1 may be formed to be bent at least once. FIG. 5 illustrates that the first connector BE1 has a shape of an angle bracket ("<" or ">"). However, a planar shape of the first connector BE1 is not limited thereto. The driving electrodes TE adjacent to each other in the second direction (Y-axis direction) are connected to each other via a plurality of first connectors BE1. Thus, even when any one of the first connectors BE1 is broken, the driving electrodes TE adjacent to each other in the second direction (Y-axis direction) may be stably connected to each other. FIG. 5 illustrates that the driving electrodes TE adjacent to each other are connected to each other by two first connectors BE1. However, the number of the first connectors BE1 is not limited thereto.

The first connectors BE1 overlapping the sensing electrodes RE with an insulating layer disposed between the first connectors BE1 and the sensing electrodes RE allow the driving electrodes TE and the sensing electrodes RE to be electrically isolated from each other at intersections of the sensing electrodes RE and the driving electrodes TE. Thus, the mutual capacitance may be formed between each of the driving electrodes TE and each of the sensing electrodes RE.

The antenna pattern AP may include the communication antenna pattern AAP and the transmit and receive antenna patterns TAP and RAP.

Each of the communication antenna pattern AAP and the transmit and receive antenna patterns TAP and RAP may be surrounded by the sensing electrode RE or the driving electrodes TE. Each of the antenna patterns AP may be electrically isolated from the sensing electrode RE and the driving electrodes TE. Each of the antenna patterns AP may be spaced apart from the sensing electrode RE and the driving electrodes TE. The antenna patterns AP may be disposed adjacent to one side of the touch sensor area TSA in the touch sensor area TSA and may be disposed outside of the touch sensor area TSA. For example, the antenna patterns AP may be disposed adjacent to a lower side and a right side of the touch sensor area TSA in the touch sensor area TSA. However, the disclosure is not limited thereto, and the antenna patterns AP may be disposed adjacent to the upper, lower, left and/or right sides of the touch sensor area TSA in the touch sensor area TSA, and may be disposed outside of the touch sensor area TSA in the sensor peripheral area TPA.

The communication antenna pattern AAP may be disposed adjacent to a lower side of the touch sensor area TSA in the touch sensor area TSA. The transmit and receive antenna patterns TAP and RAP may be disposed adjacent to a right side of the touch sensor area TSA in the touch sensor area TSA. For example, the communication antenna pattern AAP may be disposed to a lower side of the touch sensor area TSA in the first direction X. Also, the transmit and receive antenna patterns TAP and RAP may be alternately disposed to a right side of the touch sensor area TSA in the second direction Y. However, the disclosure is not limited thereto, each of the communication antenna pattern AAP and the transmit and receive antenna patterns TAP and RAP may be disposed adjacent to the upper, lower, left and/or right sides of the touch sensor area TSA in the touch sensor area TSA, and may be disposed outside of the touch sensor area TSA in the sensor peripheral area TPA.

Each of the communication antenna patterns AAP may serve as an independent antenna under the control of the antenna driving circuit 340. Alternatively, the communication antenna patterns AAP may serve as one antenna array under the control of the antenna driving circuit 340.

The transmit and receive antenna patterns TAP and RAP may play a role in recognizing a position and a speed of the user or the object to recognize a gesture under the control of the antenna driving circuit 340 as needed independently of the communication antenna patterns AAP. Alternatively, the plurality of transmit and receive antenna pattern TAP and RAP may serve to recognize the position and the speed of the user or the object to recognize a gesture with a plurality of antenna arrays under the control of the antenna driving circuit 340.

Each of the dummy patterns DE may be surrounded by the driving electrode TE or the sensing electrode RE. Each of the dummy patterns DE may be electrically isolated from the driving electrode TE or the sensing electrode RE. Each of the dummy patterns DE may be spaced apart from the driving electrode TE or the sensing electrode RE. Each of the dummy patterns DE may be electrically floated.

In FIG. 4 and FIG. 5, it is illustrated that a length in the first direction (X-axis direction) and a length in the second direction (Y-axis direction) of the antenna pattern AP are substantially equal to a half of a length in the first direction (X-axis direction) and a length in the second direction (Y-axis direction) of the dummy pattern DE, respectively. However, the disclosure is not limited thereto. For example, the length in the first direction (X-axis direction) and the length in the second direction (Y-axis direction) of the antenna pattern AP may be different from the length of the dummy pattern DE in the first direction (X-axis direction) and the length of the dummy pattern DE in the second direction (Y-axis direction).

In FIG. 4, it illustrated that each of the driving electrodes TE, the sensing electrodes RE, and the dummy pattern DE has a rhombus planar shape. However, the disclosure is not limited thereto. For example, each of the driving electrodes TE, the sensing electrodes RE, the antenna patterns AP, and the dummy pattern DE may have a planar shape of a quadrangle other than a rhombus, a polygon other than a quadrangle, a circle, or an ellipse.

Although it has been illustrated that each of the antenna patterns AP has a planar shape of a triangle, the disclosure is not limited thereto. For example, each of the antenna patterns AP may have a planar shape of a quadrangle, a polygon other, a circle, or an ellipse.

The sensor lines TL1, TL2, and RL and the antenna feed line FL may be disposed in the sensor peripheral area TPA. The sensor lines TL1, TL2, and RL may include the sensing lines RL connected to the sensing electrodes RE, and the first driving lines TL1 and the second driving lines TL2 connected to the driving electrodes TE. The sensing line RL may be defined as the first sensor line, while the first driving line TL1 and the second driving line TL2 may be defined as the second sensor line.

The driving electrodes TEs disposed at one side of the touch sensor area TSA may be connected to the first driving lines TL1 in one-to-one manner. The driving electrodes TE disposed at the other side of the touch sensor area TSA may be connected to the second driving lines TL2 in one-to-one manner. The first driving lines TL1 and the second driving lines TL2 may be connected to the first sensor pads TP1 in one-to-one manner. Therefore, the touch driving circuit 330 may be electrically connected to the driving electrodes TE. The driving electrodes TE may be disposed at both opposing sides of the touch sensor area TSA and may be connected to the driving lines TL1 and TL2 and may receive a touch drive signal therefrom.

The antenna feed lines FL may be connected to the antenna patterns AP in one-to-one manner. The antenna feed lines FL may be connected to the transmit antenna patterns TAP, the communication antenna pattern AAP, and the receive antenna patterns RAP in one-to-one manner. The antenna feed lines FL may be connected to the antenna pads FP in one-to-one manner. Therefore, the antenna driving circuit 340 may be electrically connected to the antenna patterns AP. Further, since at least one second driving line TL2 is disposed between the touch sensor area TSA and the antenna pads FP, each of the antenna feed lines FL may intersect with at least one second driving line TL2.

A display pad area DPA, a first sensor pad area TPA1, and a second sensor pad area TPA2 may be disposed at a lower side of the display panel 300. The display circuit board 310 may be disposed on the display pads DP, the first sensor pads TP1, and the second sensor pads TP2 as shown in FIG. 1. The display pads DP, the first sensor pads TP1, and the second sensor pads TP2 may be electrically connected to the display circuit board 310 using a low-resistance and high-reliability material such as an anisotropic conductive film or SAP. Therefore, the display pads DP, the first sensor pads TP1, and the second sensor pads TP2 may be electrically connected to the touch driving circuit 330 disposed on the display circuit board 310.

The antenna pads FP may be disposed in the first sensor pad area TPA1 disposed at the lower side of the display panel 300 in which the first sensor pads TP1 are disposed. The antenna pad FP may be disposed between two first sensor pads TP1 adjacent to each other.

The display circuit board 310 may be disposed to overlap the antenna pads FP and the first sensor pads TP1 in a plan view. The antenna pads FP and the first sensor pads TP1 may be electrically connected to the display circuit board 310 using a low-resistance and high-reliability material such as an anisotropic conductive film or SAP. In this case, the antenna circuit board 350 may be omitted and the antenna driving circuit 340 may be disposed on the display circuit board 310.

The antenna patterns AP and the antenna pads FP may be connected to each other in one-to-one manner via the antenna feed lines FL. The antenna feed line FL may be disposed between two first driving lines TL1 adjacent to each other.

As shown in FIG. 4 and FIG. 5, the touch sensor area TSA includes the driving electrodes TE and the sensing electrodes RE, as well as the antenna patterns AP. Therefore, the touch sensor area TSA may not only sense touch of an object or a person using the mutual capacitance between each of the driving electrodes TE and each of the sensing electrodes RE, but also transmit/receive a radio frequency signal using the antenna patterns AP, or recognize the position and the speed of the user or the object and transmit/receive a signal for recognizing a gesture.

Figure 6:
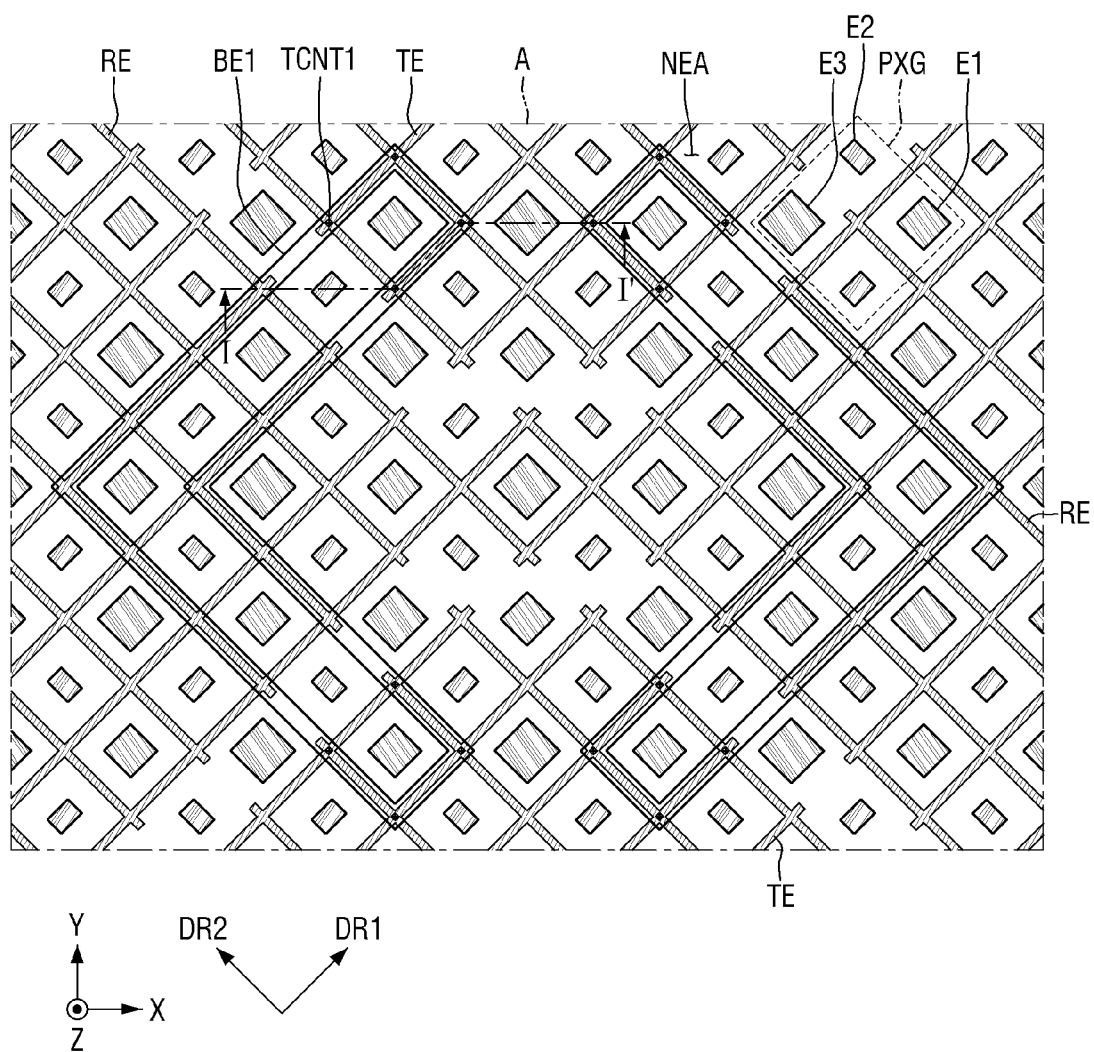
FIG. 6 is a detailed enlarged view showing the driving electrodes, the sensing electrodes, and the first connectors of FIG. 5.
Figure 7:
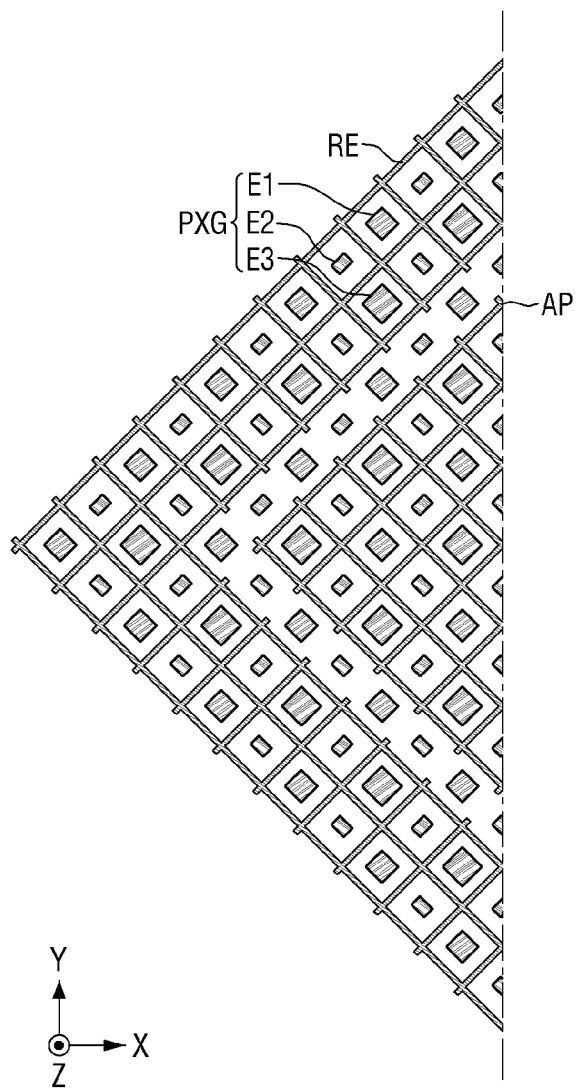
FIG. 7 is an enlarged view showing an example of the sensing electrode and an antenna pattern of FIG. 5.

FIG. 6 is a detailed enlarged view showing the driving electrodes, the sensing electrodes, and the first connectors of FIG. 5. FIG. 7 is an enlarged view showing an example of the sensing electrode and the antenna pattern of FIG. 5.

Referring to FIG. 6 and FIG. 7, the driving electrodes TE, the sensing electrodes RE, the antenna patterns AP, and the dummy patterns DE may be disposed in the same layer and thus may be spaced apart from each other. That is, a gap may be formed between the driving electrode TE and the sensing electrode RE and between the sensing electrode RE and the antenna pattern AP. Further, a gap may be formed between the driving electrode TE and the dummy pattern DE and between the sensing electrode RE and the dummy pattern DE.

It is illustrated that a length in the first direction (X-axis direction) and a length in the second direction (Y-axis direction) of the antenna pattern AP are substantially the same as a half of a length in the first direction (X-axis direction) and a length in the second direction (Y-axis direction) of the dummy pattern DE, respectively. The disclosure is not limited thereto. For example, the length in the first direction (X-axis direction) and the length in the second direction (Y-axis direction) of the antenna pattern AP may be different from the length of the length in the first direction (X-axis direction) and the length in the second direction (Y-axis direction) of the dummy pattern DE, respectively.

In order that the antenna pattern AP transmits/receives radio frequency signals of ultra-high frequency (for example, millimeter wave (mmWave)) for 5G mobile communication, or recognizes the location and the speed of the user or the object to recognize the gesture, each of the length in the first direction (X-axis direction) and the length in the second direction (Y-axis direction) of the antenna pattern AP may be in a range of approximately 2.5 mm to 4.5 mm. Each of the length in the first direction (X-axis direction) and the length in the second direction (Y-axis direction) of the dummy pattern DE may also be in a range of approximately 2.5 mm to 4.5 mm.

The first connectors BE1 may be disposed in a layer different from a layer in which the driving electrodes TE and the sensing electrodes RE are disposed. The first connector BE1 may overlap the driving electrodes TE adjacent to each other in the second direction (Y-axis direction) in the third direction (Z-axis direction). The first connector BE1 may overlap the sensing electrode RE in the third direction (Z-axis direction). One side of the first connector BE1 may be connected to one of the driving electrodes TE adjacent to each other in the second direction (Y-axis direction) via first touch contact holes TCNT1. The other side of the first connector BE1 may be connected to the other of the driving electrodes TE adjacent to each other in the second direction (Y-axis direction) via the first touch contact holes TCNT1.

The driving electrodes TE may be formed in a mesh structure or a grid structure in a plan view. The sensing electrodes RE may be formed in a mesh structure or a grid structure in a plan view. The first connectors BE1 may be formed in a mesh structure or a grid structure in a plan view. The antenna patterns AP may be formed in a mesh structure or a grid structure in a plan view. The antenna feed lines FL may be formed in a mesh structure or a grid structure in a plan view. Further, the dummy patterns DE may be formed in a mesh structure or a grid structure in a plan view. For this reason, the driving electrodes TE, the sensing electrodes RE, the first connectors BE1, the antenna patterns AP, the antenna feed lines FL, and the dummy patterns DE may not overlap the light-emitting areas E1, E2, and E3. Therefore, the light emitted from the light-emitting areas E1, E2 and E3 is not blocked by the driving electrodes TE, the sensing electrodes RE, the first connectors BE1, the antenna patterns AP, the antenna feed lines FL, and the dummy patterns DE, and thus the luminance of light is not reduced.

Alternatively, the driving electrodes TE, the sensing electrodes RE, the first connectors BE1, the antenna patterns AP, the antenna feed lines FL, and the dummy patterns DE may not have a mesh structure or a grid structure in the plan view. In this case, in order to prevent the situation that the luminance of light emitted from light-emitting areas E1, E2 and E3 is reduced due to the driving electrodes TE, the sensing electrodes RE, the first connectors BE1, the antenna patterns AP, the antenna feed lines FL, and the dummy patterns DE, the driving electrodes TE, the sensing electrodes RE, the first connectors BE1, the antenna patterns AP, the antenna feed lines FL, and the dummy patterns DE may be made of a transparent conductive material such as ITO or IZO which may transmit light therethrough, or may be made of Ag, nanowires, or a metal material having light-transmitting properties.

The light-emitting areas E1, E2 and E3 may include the first light-emitting areas E1 emitting light of a first color, the second light-emitting areas E2 emitting light of a second color, and the third light-emitting areas E3 emitting light of the third color. For example, the first color may be red, the second color may be green, and the third color may be blue.

Figure 8:
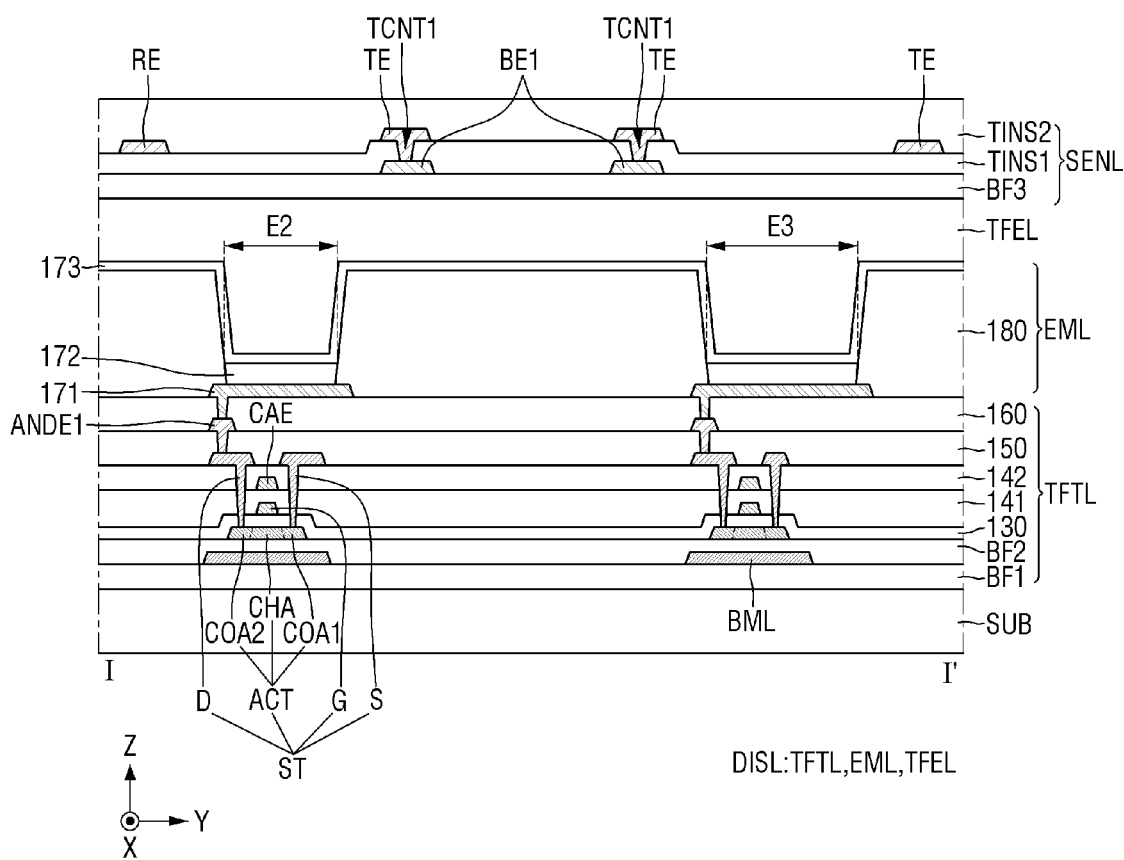
FIG. 8 is a cross-sectional view showing a display device cut along I-I' in FIG. 6.

Each of the first light-emitting area E1, the second light-emitting area E2, and the third light-emitting area E3 may have a rhombus planar shape or a rectangular planar shape. However, the disclosure is not limited thereto. A planar shape of each of the first light-emitting area E1, the second light-emitting area E2, and the third light-emitting area E3 may be a polygonal shape other than a quadrangle, a circular, or elliptical shape. Further, FIG. 6 and FIG. 8 illustrate that the third light-emitting area E3 has the largest area and the second light-emitting area E2 has the smallest area. However, the disclosure is not limited thereto.

One first light-emitting area E1, two second light-emitting areas E2, and one third light-emitting area E3 may constitute one pixel light-emitting group PXG for rendering a white gray level. That is, the light emitted from one first light-emitting area E1, the light emitted from the two second light-emitting areas E2, and the light emitted from one third light-emitting area E3 are combined with each other to produce the white gray level.

In the display device 10 according to one embodiment, the antenna patterns AP are disposed adjacent to one side of the touch sensor area TSA in the touch sensor area TSA, and the antenna patterns AP replace some of the dummy patterns DE, thereby reducing loss of the radio frequency signal and the signal of the position and the speed of the user or the object for gesture recognition from the communication antenna pattern AAP and the transmit and receive antenna patterns TAP and RAP.

Figure 9:
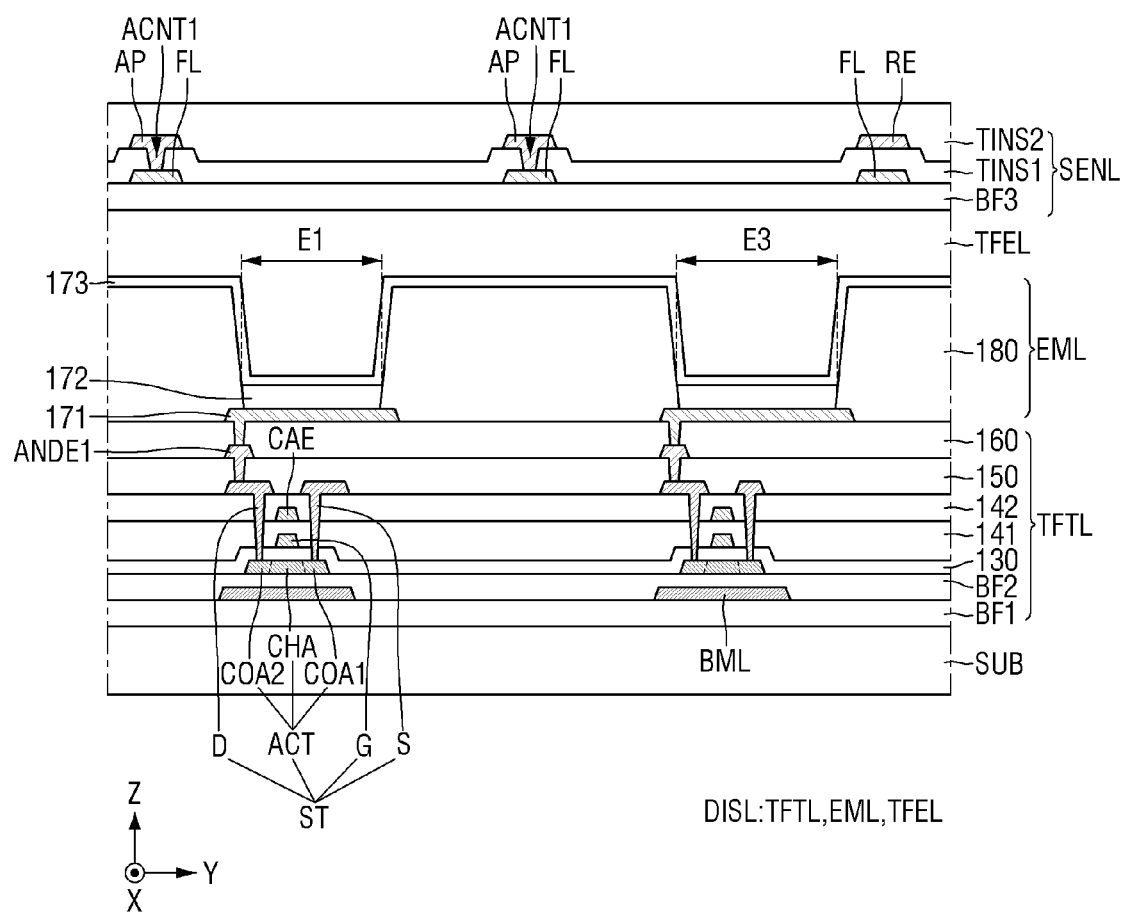
FIG. 9 is a cross-sectional view showing a display device cut along I-I' in FIG. 6.

FIG. 8 is a cross-sectional view showing a display device cut along I-I' in FIG. 6. FIG. 9 is a cross-sectional view showing a display device cut along I-I' in FIG. 6.

Referring to FIG. 8 and FIG. 9, a display layer DISL including a thin-film transistor layer TFTL, a light-emitting element layer EML, and an encapsulation layer TFEL may be disposed on a substrate SUB. A sensor layer SENL including sensor electrodes SE may be disposed on the display layer DISL.

A first the buffer film BF may be disposed on one surface of the substrate SUB. A second buffer film BF2 may be disposed on the first the buffer film BF1. The first and second buffer films BF1 and BF2 may be disposed on the one surface of the substrate SUB to protect thin-film transistors of the thin-film transistor layer TFTL and a light-emitting layer 172 of the light-emitting element layer EML from moisture passing through the substrate SUB which is vulnerable to moisture permeation. The buffer film BF may include a plurality of inorganic films that are alternately stacked. At least one of the first and second buffer films BF1 and BF2 may be omitted.

A first light-blocking layer BML may be disposed on the first the buffer film BF1. The first light-blocking layer BML may be disposed between the first buffer film BF1 and the second buffer film BF1. The first light-blocking layer BML may be composed of a single layer or multiple layers made of one of molybdenum (Mo), aluminum (Al), chromium (Cr), gold (Au), titanium (Ti), nickel (Ni), neodymium (Nd) and copper (Cu), or an alloy thereof.

An active layer ACT of the thin-film transistor ST may be disposed on the second buffer film BF2. The active layer ACT may overlap the first light-blocking layer BML in the third direction (Z-axis direction). The light incident through the substrate SUB may be blocked by the first light-blocking layer BML, thereby preventing leakage current from flowing in the active layer ACT due to the light incident through the substrate SUB.

The thin-film transistor ST includes a plurality of electrode layers G, S, D, and ANDE1, and a plurality of insulating layers 130, 141, 142, 150 and 160. A gate insulating film 130 may be formed on the active layer ACT of the thin-film transistor ST. The gate electrode G of the thin-film transistor ST may be disposed on the gate insulating film 130. The gate electrode G of the thin-film transistor ST may overlap the active layer ACT in the third direction (Z-axis direction).

A first interlayer insulating film 141 may be disposed on the gate electrode G. A capacitor electrode CAE may be disposed on the first interlayer insulating film 141. The capacitor electrode CAE may overlap the gate electrode G in the third direction (Z-axis direction).

A second interlayer insulating film 142 may be disposed on the capacitor electrode CAE. The first electrode S and the second electrode D of the thin-film transistor ST may be disposed on the second interlayer insulating film 142.

The first electrode S of the thin-film transistor ST may be connected to a first conductive area COA1 disposed on one side of a channel area CHA of the active layer ACT via a contact hole extending through the gate insulating film 130, the first interlayer insulating film 141, and the second interlayer insulating film 142. The second electrode D of the thin-film transistor ST may be connected to a second conductive area COA2 disposed on the other side of the channel area CHA of the active layer ACT via a contact hole extending through the gate insulating film 130, the first interlayer insulating film 141, and the second interlayer insulating film 142.

A first organic film 150 may be disposed on the first electrode S and the second electrode D to planarize steps caused by the thin-film transistors ST. The first organic film 150 may be composed of an organic film made of, for example, acryl resin, epoxy resin, phenolic resin, polyamide resin, or polyimide resin.

Each of the plurality of insulating layers 130, 141, 142, 150 and 160 may be composed of an inorganic film such as SiN, SiO, or SiON, an organic film, an organic-inorganic film, or a stack of an inorganic film and an organic film. Each of the plurality of electrode layers G, S, D, and ANDE1 may be formed in a single layer or in multiple layers made of one of molybdenum (Mo), aluminum (Al), chromium (Cr), gold (Au), titanium (Ti), nickel (Ni), neodymium (Nd) and copper (Cu) or an alloy thereof.

The first connective electrode ANDE1 may be disposed on the first organic film 150. The first connective electrode ANDE1 may be connected to a second electrode D of the thin-film transistor ST via a contact hole extending through the first organic film 150.

The light-emitting element layer EML is disposed on the thin-film transistor layer TFTL. The light-emitting element layer EML may include light-emitting elements 170 and a bank 180.

Each of the light-emitting elements 170 may include a first light-emitting electrode 171, the light-emitting layer 172, and a second light-emitting electrode 173. In each of the light-emitting areas E2 and E3, the first light-emitting electrode 171, the light-emitting layer 172, and the second light-emitting electrode 173 are sequentially stacked such that holes from the first light-emitting electrode 171 and electrons from the second light-emitting electrode 173 are combined with each other in the light-emitting layer 172 to emit light. In this case, the first light-emitting electrode 171 may be an anode electrode and the second light-emitting electrode 173 may be a cathode electrode.

The bank 180 may define each of the light-emitting areas E2 and E3 of the display pixels. To this end, the bank 180 may be formed on the second organic film 160 so as to expose a partial area of the first light-emitting electrode 171. The bank 180 may cover edges of the first light-emitting electrode 171.

In a top-emission type structure, the second light-emitting electrode 173 may be made of a transparent conductive material (TCO) such as ITO or IZO which may transmit light therethrough, or may be made of a semi-transmissive conductive material such as magnesium (Mg), silver (Ag), or an alloy of magnesium (Mg) and silver (Ag). When the second light-emitting electrode 173 is made of the semi-transmissive conductive material, light output efficiency may be increased due to a micro cavity.

The light-emitting layer 172 may be disposed on a top surface of the first light-emitting electrode 171 and inclined surfaces of the bank 180. The second light-emitting electrode 173 may be disposed on a top surface of the light-emitting layer 172 and the inclined surfaces of the bank 180.

The encapsulation layer TFEL may be formed on the light-emitting element layer EML. The encapsulation layer TFEL may include at least one inorganic layer to prevent penetration of oxygen or moisture into the light-emitting element layer EML. Further, the encapsulation layer TFEL may include at least one organic film to protect the light-emitting element layer EML from foreign materials such as dust. The inorganic layer may be formed as a multilayer in which one or more inorganic layers such as a silicon nitride layer, a silicon oxynitride layer, a silicon oxide layer, a titanium oxide layer, and an aluminum oxide layer are alternately stacked. The organic film may be made of acryl resin, epoxy resin, phenolic resin, polyamide resin, or polyimide resin.

The sensor layer SENL is disposed on the encapsulation layer TFEL. The sensor layer SENL may include the sensor electrodes SE which includes the driving electrodes TE, the sensing electrodes RE and the first connectors BE1.

A third the buffer film BF3 may be disposed on the encapsulation layer TFEL. The third the buffer film BF3 may be a layer having insulating and optical functions. The third the buffer film BF3 may include at least one inorganic film.

The first connectors BE1 and the antenna feed lines FL may be disposed on the third the buffer film BF3. Each of the first connectors BE1 and the antenna feed lines FL may be composed of a single layer made of molybdenum (Mo), titanium (Ti), copper (Cu), and aluminum (Al), or a stacked structure of aluminum and titanium (Ti/Al/Ti), and a stacked structure of aluminum and ITO (ITO/Al/ITO), APC alloy, and a stacked structure of APC alloy and ITO (ITO/APC/ITO).

A first sensor insulating film TINS1 may be disposed on the first connectors BE1 and the antenna feed lines FL. The first sensor insulating film TINS1 may be a layer having insulating and optical functions.

Each of the third the buffer film BF3 and the first sensor insulating film TINS1 may be composed of an inorganic film, for example, a silicon nitride layer, a silicon oxynitride layer, a silicon oxide layer, a titanium oxide layer, or an aluminum oxide layer. The first sensor insulating film TINS1 may be formed by a lamination process using a soft material, a spin coating using a solution-type material, a process such as slit die coating, or a vapor deposition process.

The driving electrodes TE, the sensing electrodes RE, and the antenna patterns AP may be disposed on the first sensor insulating film TNIS1. The antenna patterns AP may include the communication antenna pattern AAP, the receive antenna pattern RAP and the transmit antenna pattern TAP, as described above. The driving electrodes TE, the sensing electrodes RE, and the antenna patterns AP do not overlap the light-emitting areas E2 and E3. Each of the driving electrodes TE, the sensing electrodes RE, and the antenna patterns AP may be composed of a single layer made of molybdenum (Mo), titanium (Ti), copper (Cu), and aluminum (Al), or a stacked structure of aluminum and titanium (Ti/Al/Ti), and a stacked structure of aluminum and ITO (ITO/Al/ITO), APC alloy, and a stacked structure of APC alloy and ITO (ITO/APC/ITO).

A second sensor insulating film TINS2 may be disposed on the driving electrodes TE, the sensing electrodes RE, and the antenna patterns AP. The second sensor insulating film TINS2 may be a layer having insulating and optical functions. The second sensor insulating film TINS2 may include at least one of an inorganic film and an organic film. The inorganic layer may be a silicon nitride layer, a silicon oxynitride layer, a silicon oxide layer, a titanium oxide layer, or an aluminum oxide layer. The organic film may be made of acryl resin, epoxy resin, phenolic resin, polyamide resin, or polyimide resin. The second sensor insulating film TINS2 may be formed by a lamination process using a soft material, a spin coating using a solution-type material, a process such as slit die coating, or a vapor deposition process.

The communication antenna pattern AAP, the receive antenna pattern RAP and the transmit antenna pattern TAP may be disposed in the same layer, and may be simultaneously formed using the same material.

In the display device 10 according to one embodiment, the driving electrodes TE, the sensing electrodes RE, and the antenna patterns AP may be disposed in the same layer, and may be simultaneously formed using the same material. Further, the first connectors BE1 and the antenna feed lines FL may be disposed in the same layer, and may be simultaneously formed using the same material.

Figure 10:
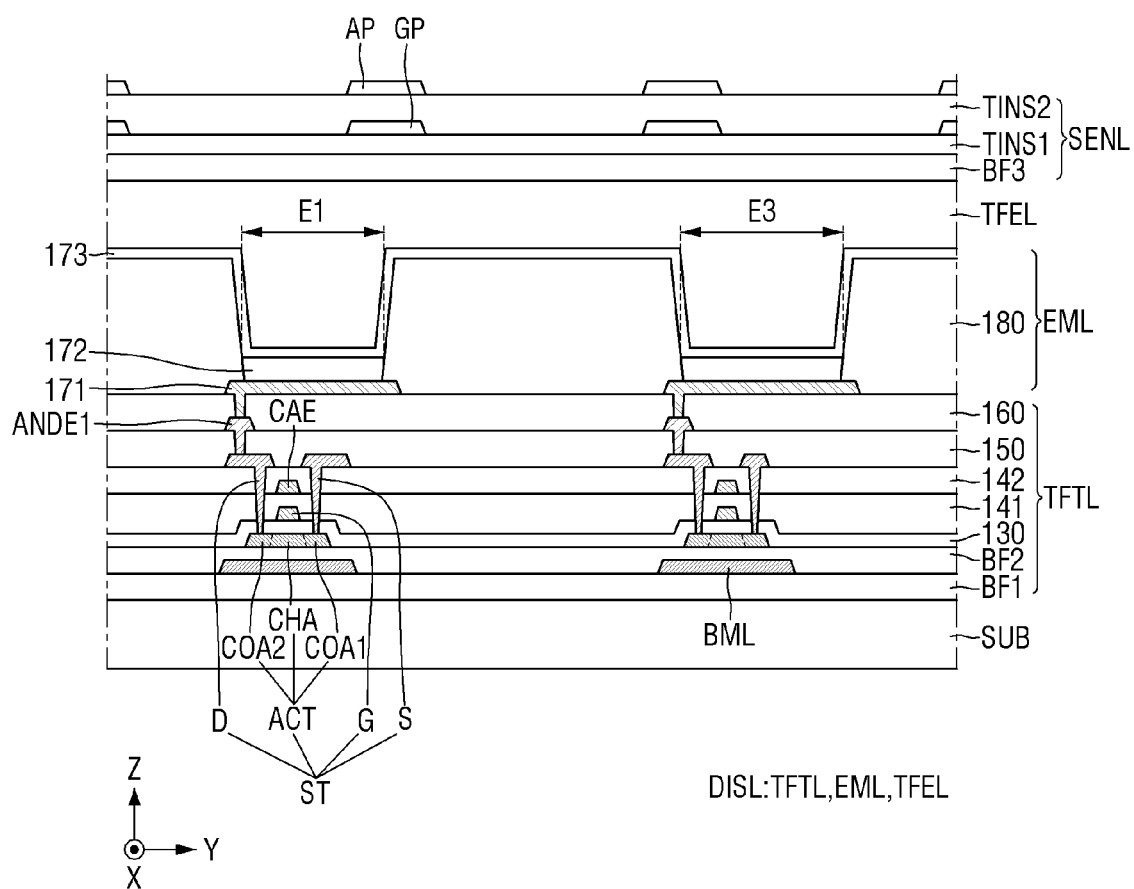
FIG. 10 is a cross-sectional view showing a display device according to another embodiment.

FIG. 10 is a cross-sectional view showing a display device according to another embodiment.

Referring to FIG. 10, a capacitor electrode pattern GP may be disposed on the first sensor insulating film TNIS1. The capacitor electrode pattern GP may be disposed in the same layer as a layer in which the antenna feed line FL is disposed. The capacitor electrode pattern GP may be disposed on the third the buffer film BF3. The capacitor electrode pattern GP may overlap the antenna pattern AP in the third direction (Z-axis direction). Since the second sensor insulating film TINS2 having a predefined dielectric constant is disposed between the capacitor electrode pattern GP and the antenna pattern AP, capacitance may be generated between the capacitor electrode pattern GP and the antenna pattern AP. As an overlapping area between the capacitor electrode pattern GP and the antenna pattern AP increases, a magnitude of the capacitance may increase.

The second sensor insulating film TINS2 may be disposed on the capacitor electrode pattern GP. The antenna pattern AP may be disposed on the second sensor insulating film TINS2.

The capacitor electrode pattern GP may be formed in a mesh structure or a grid structure in a plan view. Accordingly, the capacitor electrode pattern GP may not overlap the light-emitting areas E2 and E3. Therefore, the light emitted from the light-emitting areas E2 and E3 is not blocked by the capacitor electrode pattern GP, thereby preventing the luminance of the light from being reduced.

Due to the capacitance formed between the capacitor electrode pattern GP and the antenna pattern AP, a radio frequency signal received by the antenna pattern AP may be coupled to the capacitor electrode pattern GP. Further, the radio frequency signal supplied to the capacitor electrode pattern GP may be coupled to the antenna pattern AP.

Further, due to the capacitance formed between the capacitor electrode pattern GP and the transmit and receive antenna patterns TAP and RAP, the radio frequency signal received by the receive antenna pattern RAP may be coupled to the capacitor electrode pattern GP. Further, a transmit frequency signal supplied to the capacitor electrode pattern GP may be coupled to the transmit antenna pattern TAP.

Figure 11:
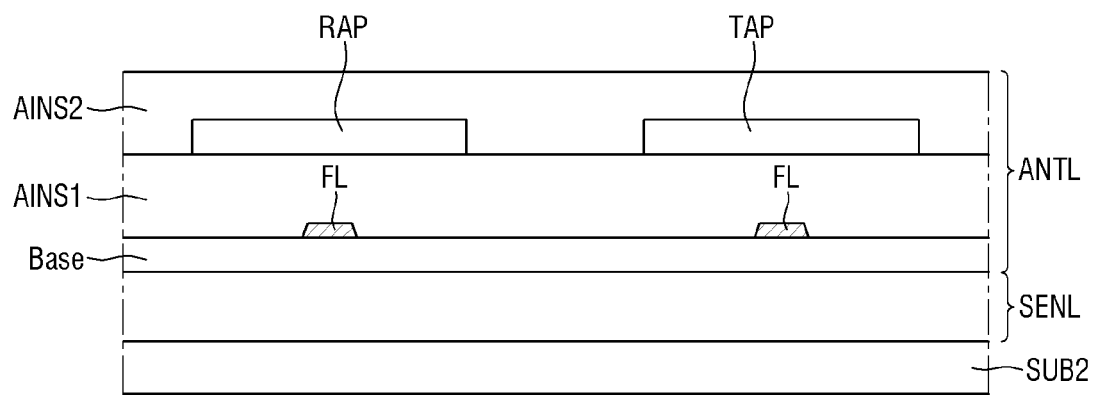
FIG. 11 is a cross-sectional view showing an antenna layer according to still another embodiment.

FIG. 11 is a cross-sectional view showing an antenna layer according to still another embodiment.

Referring to FIG. 11, the sensor layer SENL is disposed on the second substrate SUB2 and the antenna layer ANTL is disposed on the sensor layer SENL. Hereinafter, the difference from the embodiment of FIG. 5 to FIG. 9 will be mainly described.

The second substrate SUB2 may be made of an insulating material such as glass, quartz, or polymer resin.

The second substrate SUB2 may be a rigid substrate or a flexible substrate capable of bending, folding, rolling, etc.

The sensor layer SENL may be disposed on the second substrate SUB2. The sensor layer SENL may include sensor electrodes. The sensor layer SENL may sense touch using the sensor electrodes.

The antenna layer ANTL may be disposed on the sensor layer SENL. The antenna layer ANTL may include a base layer BASE, a first antenna insulating layer AINS1, the antenna pattern AP and a second antenna insulating layer AINS2.

The antenna feed line FL may be disposed on the base layer BASE disposed on the sensor layer SENL. The antenna feed lines FL may be connected to the antenna patterns AP in one-to-one manner, as described above. The antenna feed lines FL may be connected to the transmit antenna patterns TAP, and the receive antenna patterns RAP in one-to-one manner. The antenna feed lines FL may be connected to the antenna pads FP in one-to-one manner.

The base layer BASE and the first antenna insulating layer AINS1 may be substantially the same as the first sensor insulating layer TINS1 and the second sensor insulating layer TINS2 as described above. Thus, a description thereof will be omitted.

The antenna pattern AP may be disposed on the first antenna insulating layer AINS1. The antenna patterns AP may not have a mesh or grid structure in a plan view. For example, each of the antenna patterns AP may have a planar shape of a polygonal shape other than a rhombus and a quadrangle, a circle, or an ellipse.

Further, the antenna layer ANTL may include the communication antenna pattern AAP and the transmit and receive antenna patterns TAP and RAP. The antenna layer ANTL may be configured for transmitting/receiving radio frequency signals using the communication antenna patterns AAP and for recognizing the user's gesture using the transmit and receive antenna patterns TAP and RAP.

Figure 12:
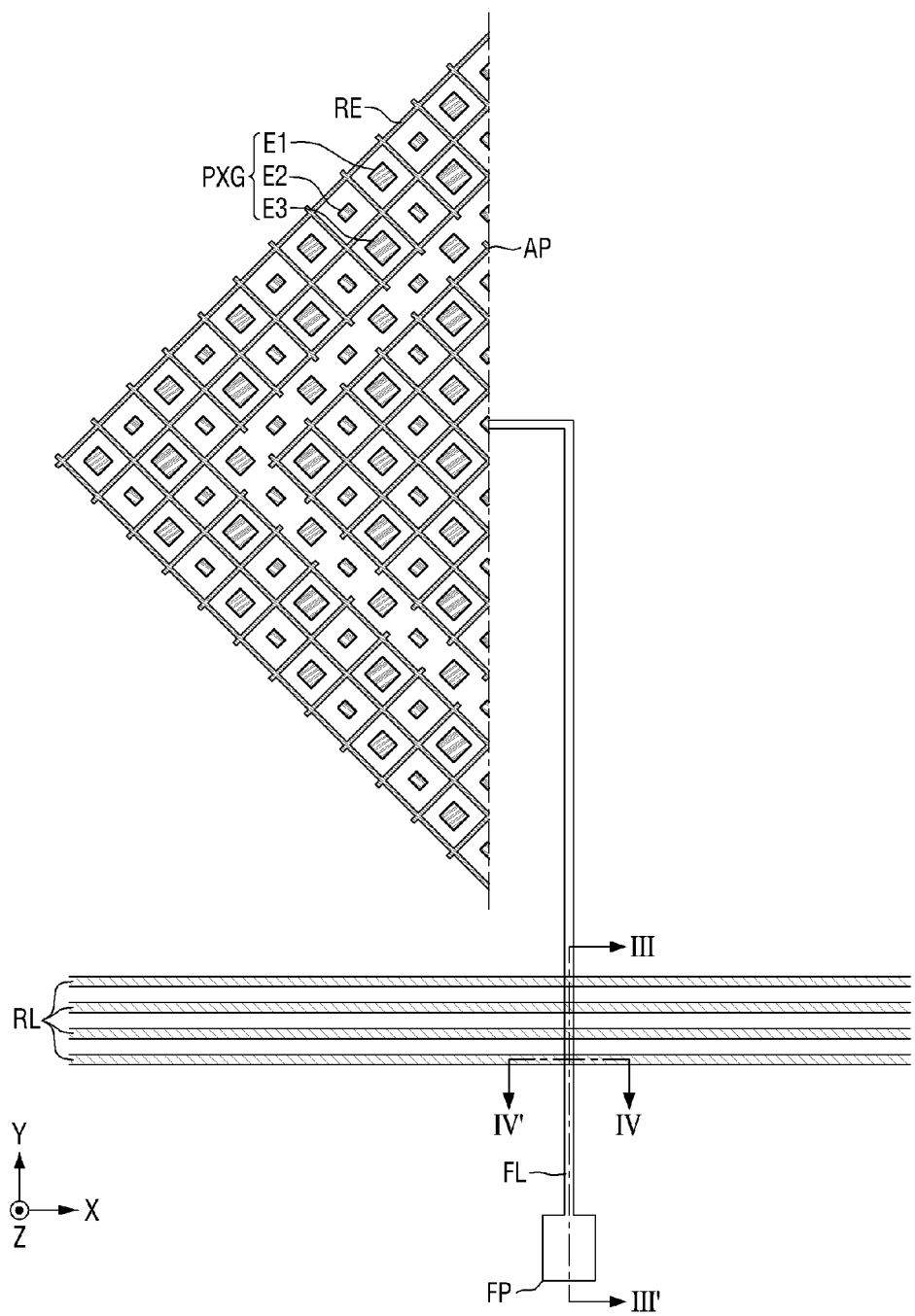
FIG. 12 is a layout diagram showing a touch line, a sensing line and a feed line.
Figure 13:
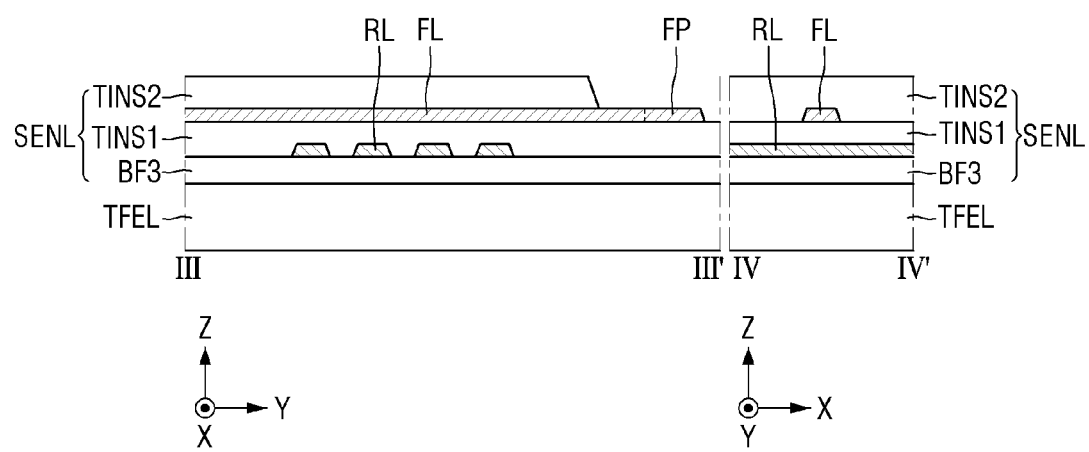
FIG. 13 and FIG. 14 are cross-sectional views cut along I-I' and I-I' in FIG. 12, respectively.
Figure 14:
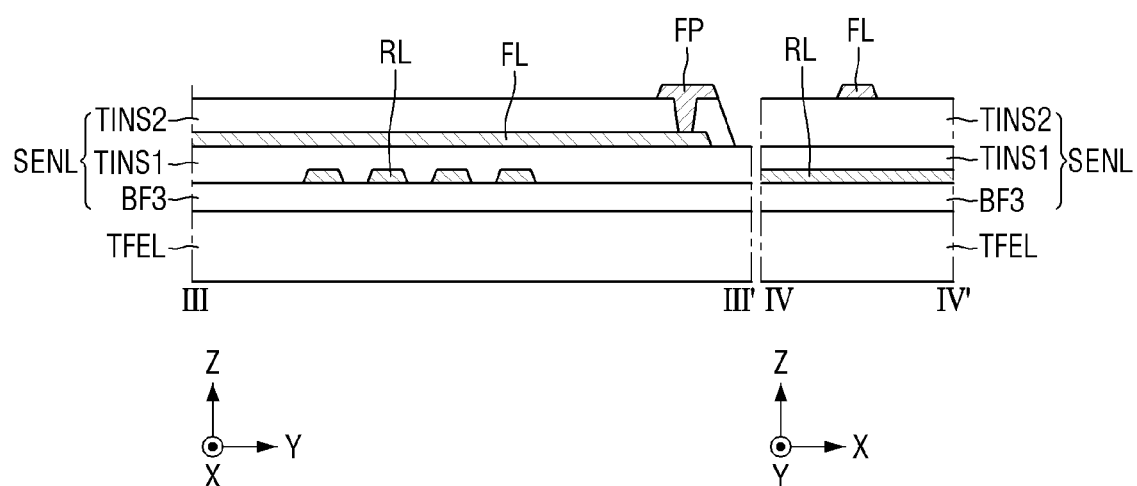

FIG. 12 is a layout diagram showing a touch line, a sensing line and a feed line. FIG. 13 and FIG. 14 are cross-sectional views cut along I-I' and I-I' in FIG. 12, respectively.

In FIG. 13 and FIG. 14, the substrate SUB and the thin-film transistor layer TFTL and the light-emitting element layer EML are omitted for convenience of illustration.

Referring to FIG. 12 and FIG. 13, the antenna feed line FL may be disposed on the first sensor insulating film TINS1, and may be connected to the antenna pad FP disposed on the first sensor insulating film TINS1. The antenna pad FP may not be covered with the second sensor insulating film TINS2 and thus may be exposed. For this reason, the antenna pad FP may be electrically connected to a bump of the antenna circuit board 350 using a low-resistance and high-reliability material such as an anisotropic conductive film or SAP.

The sensing lines RL that intersects the antenna feed line FL may be disposed on the third the buffer film BF3, and may be covered by the first sensor insulating film TINS1. For this reason, the antenna feed line FL may be connected to the antenna pad FP and the antenna pattern AP while insulated from the sensing lines RL.

In one example, each of the sensing lines RL may include a second driving line disposed on the third the buffer film BF3 and a second driving line disposed on the first sensor insulating film TINS1 which are connected to each other to reduce resistance in an area except for an area in which each of the sensing lines RL intersects the antenna feed line FL.

Referring to FIG. 12 and FIG. 14, the antenna feed line FL and the antenna pad FP may be disposed on the second sensor insulating film TINS2. This is a difference from the embodiment of FIG. 13.

The antenna feed line FL may be disposed on the first sensor insulating film TINS1 and may be connected to the antenna pad FP disposed on the second sensor insulating film TINS2 disposed on the first sensor insulating film TINS1. For this reason, the antenna pad FP may be electrically connected to a bump of the antenna circuit board 350 using a low-resistance and high-reliability material such as an anisotropic conductive film or SAP.

The sensing lines RL intersecting the antenna feed line FL may be disposed on the third the buffer film BF3 and may be covered by the first sensor insulating film TINS1. The second sensor insulating film TINS2 may be disposed on the first sensor insulating film TINS1.

In one example, each of the sensing lines RL may include a sensing line RL of a first layer disposed on the third the buffer film BF3 to reduce resistance in an area except for an area in which intersecting the antenna feed line FL.

Thus, the antenna feed line FL may be connected to the antenna pad FP and the antenna pattern AP while insulated from the sensing lines RL.

It is apparent to those skilled in the art that when the sensor layer SENL is disposed on the second substrate SUB2, as shown in FIG. 3, the encapsulation layer TFEL of FIG. 13 and FIG. 14 may be replaced with the second substrate SUB2.

Figure 15:
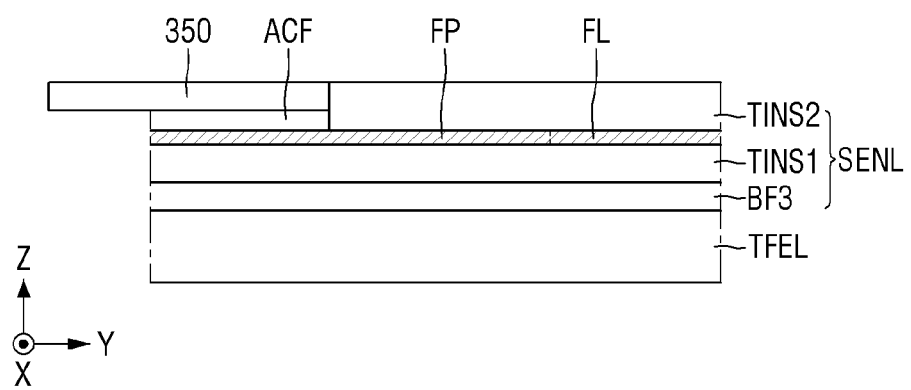
FIG. 15 is a cross-sectional view of a display device according to one embodiment.

FIG. 15 is a cross-sectional view of a display device according to one embodiment.

In FIG. 15, the substrate SUB, the thin-film transistor layer TFTL and the light-emitting element layer EML are omitted for convenience of description. Referring to FIG. 15, as described above, the sensor layer SENL including the antenna feed line FL and the antenna pad FP is disposed on the encapsulation layer TFEL. The antenna circuit board 350 is disposed on the sensor layer SENL.

An antenna pad area in which the antenna pads FP are disposed may be disposed at the lower side of the display panel 300. A conductive film ACF may be disposed on the antenna pad FP connected to the antenna feed line FL. The antenna circuit board 350 may be disposed on the conductive film ACF. The conductive film ACF may be embodied as a low-resistance and high-reliability material such as an anisotropic conductive film or SAP to electrically connect the antenna pads FP and the antenna circuit board 350 to each other.

Therefore, the antenna pad FP connected to the antenna pattern AP through the antenna feed line FL may be connected to the antenna circuit board 350. Accordingly, the antenna driving circuit 340 on the antenna circuit board 350 may selectively drive the communication antenna pattern AAP and the transmit and receive antenna patterns TAP and RAP to perform the gesture recognition based on a mode selection from the user.

Figure 16:
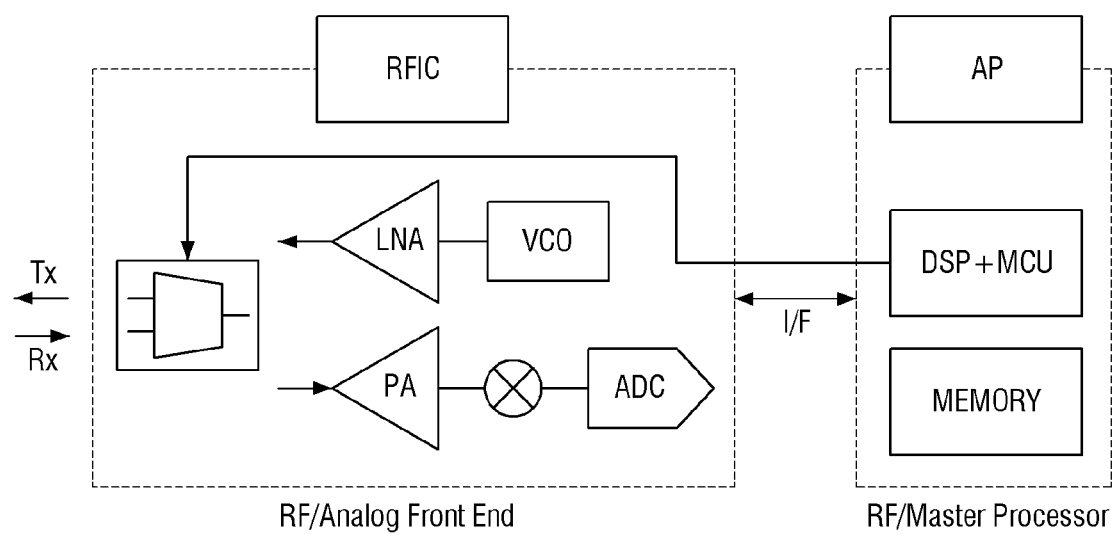
FIG. 16 is a schematic diagram of an antenna driving circuit for a gesture sensing method.
Figure 17:
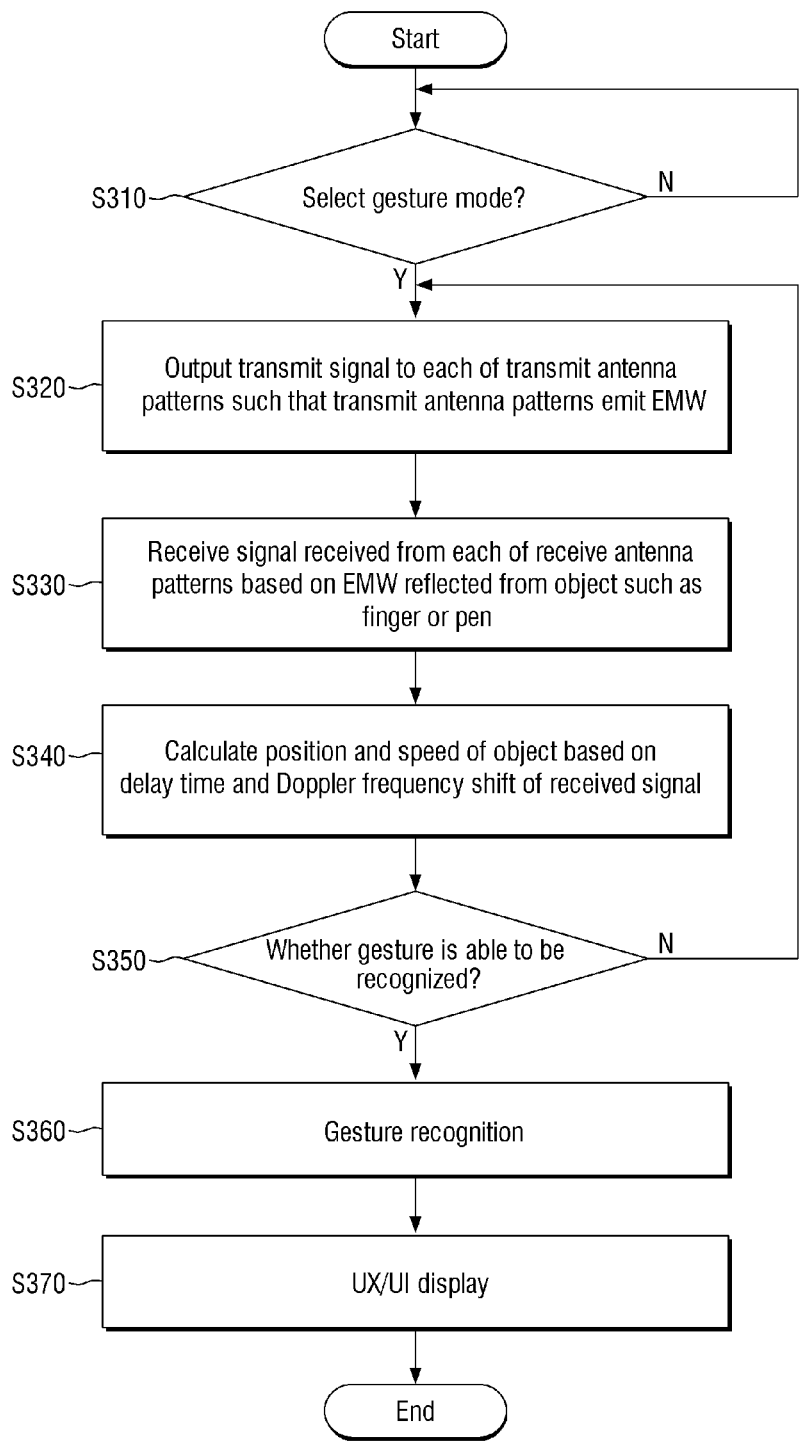
FIG. 17 is a flowchart showing a gesture sensing method according to one embodiment.
Figure 18:
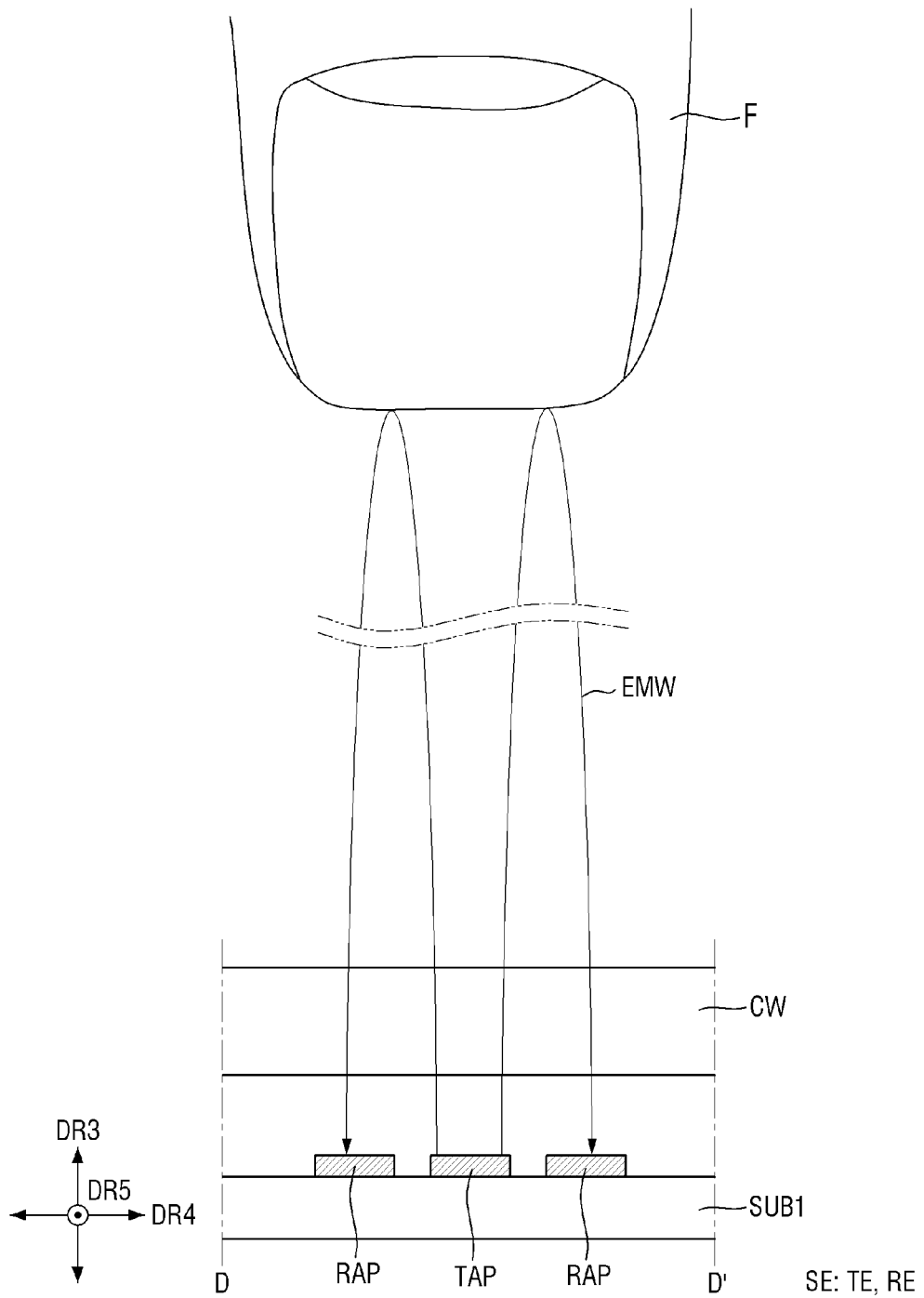
FIG. 18 is a view showing a gesture sensing method according to one embodiment.

FIG. 16 is a schematic diagram of the antenna driving circuit for a gesture sensing method. FIG. 17 is a flowchart showing the gesture sensing method according to one embodiment. FIG. 18 is a cross-sectional view showing the gesture sensing method according to one embodiment.

Hereinafter, the gesture sensing method according to one embodiment will be described with reference to FIG. 16 to FIG. 18.

First, the user or the host selects a gesture mode in S310.

When the user or the host selects the gesture mode, the antenna driving circuit 340 may selectively drive the transmit and receive antenna patterns TAP and RAP among the antenna patterns AP in an area in contact with one side of the touch sensor area TSA. For example, at least three or more transmit and receive antenna patterns TAP and RAP among the antenna patterns AP may be selected. As described above, each of the transmit and receive antenna patterns TAP and RAP may be surrounded by the sensor electrode SE. Each of the transmit and receive antenna patterns TAP and RAP may be electrically isolated from the sensor electrode SE. Each of the transmit and receive antenna patterns TAP and RAP may be spaced apart from the sensor electrode SE. The transmit and receive antenna patterns TAP and RAP may be disposed on one side of the touch sensor area TSA, and may be disposed outside of the touch sensor area TSA.

Second, the antenna driving circuit 340 outputs a transmit signal to each of the at least three transmit antenna patterns TAP in S320.

Each of the transmit antenna patterns TAP emits electromagnetic wave EMW for a gesture in response to the transmit signal. The electromagnetic wave EMW for the gesture may have a frequency of 10 GHz to 100 GHz, or may have a frequency of 39 to 60 GHz. As shown in FIG. 18, the electromagnetic wave EMW radiated from the transmit antenna pattern TAP may be reflected from an object such as a finger F or a pen positioned approximately 1 m away from the cover window CW.

Third, the antenna driving circuit 340 may receive a signal received from each of the receive antenna patterns RAP based on the electromagnetic wave EMW reflected from the object such as the finger F or the pen in S330.

In this regard, a time difference may exist between a time when the transmit antenna pattern TAP transmits the electromagnetic wave EMW and a time when the receive antenna pattern RAP receives the electromagnetic wave EMW. For example, the time difference may vary depending on a distance between the transmit antenna pattern TAP and the object such as the finger F or the pen, and a distance between the object such as the finger F or the pen and the receive antenna pattern RAP.

Further, a frequency of each received signal based on the reflected electromagnetic wave EMW may have a frequency shift from the transmit signal due to the Doppler effect. The frequency shift is determined based on a relative velocity of the object such as the finger F or the pen relative to the transmit antenna pattern TAP.

For example, when the object such as the finger F or the pen is moving at a constant speed, frequencies of the transmit signal and the received signal as the electromagnetic wave EMW may be different from each other. When the object such as the finger F or the pen is moving away from the receive antenna pattern RAP in the third direction Z, the frequency of the received signal may be lower than the frequency of the transmit signal. When the object such as the finger F or the pen is approaching the receive antenna pattern RAP in the third direction Z, the frequency of the received signal may be higher than the frequency of the transmit signal. When the object such as the finger F or the pen moves towards the transmit antenna pattern TAP along the first direction X and/or the second direction Y, the frequency of the received signal may be higher than the frequency of the transmit signal. When the object such as the finger F or the pen moves away from the transmit antenna pattern TAP along the opposite direction to the first direction X and/or the second direction Y, the frequency of the received signal may be lower than the frequency of the transmit signal.

Fourth, the antenna driving circuit 340 may calculate a specific position and a speed as touch coordinates in S340.

The antenna driving circuit 340 may calculate a specific position and a speed between the receive antenna patterns RAP as gesture coordinates based on a time difference and a frequency shift of each of the received signals received from the selected receive antenna patterns RAP.

A received signal received from each of the receive antenna patterns RAP may vary depending on a location of the object such as the finger F or the pen. The antenna driving circuit 340 may calculate a position of the object as coordinates based on the time difference and the frequency shift of the received signal. Further, the antenna driving circuit 340 may calculate the speed of the object based on the time difference and the frequency shift of the received signal received from each of the receive antenna patterns RAP.

Fifth, the antenna driving circuit 340 may determine whether the gesture is able to be recognized in S350.

The antenna driving circuit 340 recognizes a moving speed and a moving direction at a specific location calculated as the touch coordinates, and determines whether the recognized speed and direction are the same as stored gesture recognition information.

Referring to FIG. 16, the antenna driving circuit 340 may include a transmitter. The transmitter may include a filter, a mixer, and a power amplifier (PA). Further, the antenna driving circuit 340 may include a receiver. The receiver may include a filter, a mixer, and a low noise amplifier (LNA).

The antenna driving circuit 340 compares the stored gesture recognition information with the speed and the direction at the touch coordinates. When an intensity of the electromagnetic wave EMW is low or it is difficult to determine whether information about the received electromagnetic wave EMW is the same as the stored gesture recognition information, the antenna driving circuit 340 may control transmit electrodes so as to output different transmit signals to the transmit electrodes, respectively. Specifically, the antenna driving circuit 340 may change the positions and the number of the transmit antenna patterns TAP outputting the transmit signal. For example, when a spacing between the transmit antenna patterns TAP that output the transmit signal is small, the antenna driving circuit 340 may select the transmit antenna patterns TAP so that the spacing between the transmit antenna patterns TAP is widened. Alternatively, the antenna driving circuit 340 may control the transmit electrodes so as to enhance an intensity of the electromagnetic wave EMW of the transmit signal. As a result, the delay time is increased, so that the position and the velocity of the object may be calculated more accurately.

Finally, when the speed and the direction at the touch coordinates are the same as the stored gesture recognition information, the antenna driving circuit 340 may execute a gesture recognition in S360, and may display the gesture recognition result on a display screen in S370.

The display device 10 according to one embodiment transmits/receives the electromagnetic wave EMW having a frequency of 10 GHz to 100 GHz using the transmit antenna patterns TAP and the receive antenna patterns RAP to detect proximity gesture rather than to perform a wireless communication function. Further, when a sensitivity level is low, the device selectively drives the transmit and receive antenna patterns TAP and RAP as needed to recognize accurately the gesture and to reduce required power consumption.

FIG. 19 is a flowchart showing a gesture sensing method according to another embodiment.

FIG. 19 is different from the embodiment of FIG. 16 to FIG. 18 in that a modulated transmit signal is output to each of the transmit electrodes, and a modulated received signal is received by each of the receive electrodes. Accordingly, the description redundant with the embodiment of FIG. 16 to FIG. 18 will be omitted.

First, the antenna driving circuit 340 continuously outputs a modulated transmit signal to each of the at least three transmit antenna patterns TAP in S420.

Each of the transmit antenna patterns TAP emits continuously modulated electromagnetic wave EMW for gesture based on the transmit signal. As described above, the electromagnetic wave EMW for the gesture may have a frequency of 10 GHz to 100 GHz, or may have a frequency of 39 to 60 GHz. The modulated electromagnetic wave EMW for the gesture as obtained by continuously modulating the frequency of 39 to 60 GHz may be transmitted to the transmit electrode. As shown in FIG. 18, the electromagnetic wave EMW radiated from the transmit antenna pattern TAP may be reflected from an object such as a finger F or a pen positioned approximately 1 m away from the cover window CW.

Next, the antenna driving circuit 340 may receive the received signal received from each of the receive antenna patterns RAP based on the electromagnetic wave EMW reflected from the object such as the finger F or the pen in S430.

In this regard, a time difference may exist between a time when the transmit antenna pattern TAP transmits the electromagnetic wave EMW and a time when the receive antenna pattern RAP receives the electromagnetic wave EMW. For example, the time difference may vary depending on a distance between the transmit antenna pattern TAP and the object such as the finger F or the pen, and a distance between the object such as the finger F or the pen and the receive antenna pattern RAP.

Further, a frequency of each received signal based on the reflected electromagnetic wave EMW may have a frequency shift from the transmit signal due to the Doppler effect. The frequency shift is determined based on a relative velocity of the object such as the finger F or the pen relative to the transmit antenna pattern TAP.

For example, when the object such as the finger F or the pen is moving at a constant speed, frequencies of the transmit signal and the received signal as the electromagnetic wave EMW may be different from each other. When the object such as the finger F or the pen is moving away from the receive antenna pattern RAP in the third direction Z, the frequency of the received signal may be lower than the frequency of the transmit signal. When the object such as the finger F or the pen is approaching the receive antenna pattern RAP in the third direction Z, the frequency of the received signal may be higher than the frequency of the transmit signal. When the object such as the finger F or the pen moves towards the transmit antenna pattern TAP along the first direction X and/or the second direction Y, the frequency of the received signal may be higher than the frequency of the transmit signal. When the object such as the finger F or the pen moves away from the transmit antenna pattern TAP along the opposite direction to the first direction X and/or the second direction Y, the frequency of the received signal may be lower than the frequency of the transmit signal.

Accordingly, a frequency of the received signal may also be changed continuously based on the continuously modulated electromagnetic wave EMW. For example, when the modulated electromagnetic wave EMW for the gesture as obtained by continuously modulating the frequency of 39 to 60 GHz is transmitted to the transmit electrode, the receive antenna pattern RAP may receive the continuously modulated received signal.

Then, the antenna driving circuit 340 may calculate a specific position and a speed as touch coordinates in S440.

The antenna driving circuit 340 may calculate a specific position and a speed between the receive antenna patterns RAP as gesture coordinates based on a time difference and a continuously modulated frequency shift of each of the received signals received from the selected receive antenna patterns RAP.

A received signal received from each of the receive antenna patterns RAP may vary depending on a location of the object such as the finger F or the pen. The antenna driving circuit 340 may calculate a position of the object as coordinates based on the time difference and the frequency shift of the received signal. Further, the antenna driving circuit 340 may calculate the speed of the object based on the time difference and the frequency shift of the received signal received from each of the receive antenna patterns RAP.

Subsequently, the antenna driving circuit 340 may determine whether the gesture is able to be recognized in S450.

The antenna driving circuit 340 recognizes a moving speed and a moving direction at a specific location calculated as the touch coordinates, and determines whether the recognized speed and direction are the same as stored gesture recognition information.

Referring to FIG. 16, the antenna driving circuit 340 may include a transmitter. The transmitter may include a filter, a mixer, and a power amplifier (PA). Further, the antenna driving circuit 340 may include a receiver. The receiver may include a filter, a mixer, and a low noise amplifier (LNA).

The antenna driving circuit 340 compares the stored gesture recognition information with the speed and the direction at the touch coordinates. When an intensity of the electromagnetic wave EMW is low or it is difficult to determine whether information about the received electromagnetic wave EMW is the same as the stored gesture recognition information, the antenna driving circuit 340 may control transmit electrodes so as to output different transmit signals to the transmit electrodes, respectively. Specifically, the antenna driving circuit 340 may change the positions and the number of the transmit antenna patterns TAP outputting the transmit signal. For example, when a spacing between the transmit antenna patterns TAP that output the transmit signal is small, the antenna driving circuit 340 may select the transmit antenna patterns TAP so that the spacing between the transmit antenna patterns TAP is widened. Alternatively, the antenna driving circuit 340 may control the transmit electrodes so as to enhance an intensity of the electromagnetic wave EMW of the transmit signal. As a result, the delay time is increased, so that the position and the velocity of the object may be calculated more accurately.

Finally, when the speed and the direction at the touch coordinates are the same as the stored gesture recognition information, the antenna driving circuit 340 may execute a gesture recognition in S460, and may display the gesture recognition result on a display screen in S470.

The display device 10 according to one embodiment transmits/receives the electromagnetic wave EMW using the transmit antenna patterns TAP and the receive antenna patterns RAP to detect proximity gesture rather than to perform a wireless communication function. Further, when a sensitivity level is low, the device selectively drives the transmit and receive antenna patterns TAP and RAP as needed to recognize accurately the gesture and to reduce required power consumption.

What is claimed is:

1. A gesture sensing method comprising:
   outputting a transmit signal to each of transmit antenna patterns;
   receiving a signal from each of receive antenna patterns, the signal being an electromagnetic wave reflected from an object;
   calculating a specific position of the object as touch coordinates and a moving speed of the object as gesture coordinates based on a time difference and a frequency shift of each of the received signals received from the receive antenna patterns;
   recognizing the moving speed and a moving direction at the touch coordinates and determining whether the moving speed and the moving direction at the touch coordinates are the same as stored gesture recognition information; and
   executing a gesture recognition and displaying the gesture recognition result on a display screen when the moving speed and the moving direction at the touch coordinates are the same as the stored gesture recognition information.

2. The gesture sensing method of claim 1, wherein each of the transmit antenna patterns and receive antenna patterns is surrounded by a sensor electrode for sensing a touch, and
   wherein each of the transmit antenna patterns and receive antenna patterns is electrically isolated from the sensor electrode.

3. The gesture sensing method of claim 1, wherein each of the transmit antenna patterns emits electromagnetic wave in response to the transmit signal.

4. The gesture sensing method of claim 1, wherein the electromagnetic wave has a frequency of 10 GHz to 100 GHz.

5. The gesture sensing method of claim 1, wherein the recognizing a moving speed and a moving direction at the touch coordinates, and determines whether the moving speed and the moving direction are the same as stored gesture recognition information includes:
   comparing the stored gesture recognition information with the moving speed and the moving direction at the touch coordinates; and
   changing positions of the transmit antenna patterns and a number of the transmit antenna patterns when an intensity of the electromagnetic wave is low or it is difficult to determine whether information about the received electromagnetic wave is same as the stored gesture recognition information.

6. The gesture sensing method of claim 1, wherein the outputting a transmit signal to each of transmit antenna patterns includes:
   continuously outputting a modulated transmit signal to each of the transmit antenna patterns.

7. The gesture sensing method of claim 6, wherein each of the transmit antenna patterns emits continuously modulated electromagnetic wave based on the modulated transmit signal.

8. The gesture sensing method of claim 7, wherein a frequency of the received signal is changed continuously based on the continuously modulated electromagnetic wave.

9. A gesture sensing method comprising:
   outputting a transmit signal to each of transmit antenna patterns;
   receiving a signal from each of receive antenna patterns, the signal being an electromagnetic wave reflected from an object;

calculating a specific position of the object as touch coordinates and a moving speed of the object as gesture coordinates based on a time difference and a frequency shift of each of the received signals received from the receive antenna patterns;

recognizing the moving speed and a moving direction at the touch coordinates and determining whether the moving speed and the moving direction at the touch coordinates are the same as stored gesture recognition information; and executing a gesture recognition and displaying the gesture recognition result on a display screen when the moving speed and the moving direction at the touch coordinates are the same as the stored gesture recognition information, wherein each of the transmit antenna patterns and receive antenna patterns is surrounded by a sensor electrode for sensing a touch, and wherein each of the transmit antenna patterns and receive antenna patterns is electrically isolated from the sensor electrode.

10. The gesture sensing method of claim 9, wherein each of the transmit antenna patterns emits electromagnetic wave in response to the transmit signal.

11. The gesture sensing method of claim 9, wherein the electromagnetic wave has a frequency of 10 GHz to 100 GHz.

12. The gesture sensing method of claim 9, wherein the recognizing a moving speed and a moving direction at the touch coordinates and determines whether the moving speed and the moving direction are the same as stored gesture recognition information includes:

comparing the stored gesture recognition information with the moving speed and the moving direction at the touch coordinates; and changing positions of the transmit antenna patterns and a number of the transmit antenna patterns when an intensity of the electromagnetic wave is low or it is difficult to determine whether information about the received electromagnetic wave is same as the stored gesture recognition information.

13. The gesture sensing method of claim 9, wherein the outputting a transmit signal to each of transmit antenna patterns includes:

continuously outputting a modulated transmit signal to each of the transmit antenna patterns.

14. The gesture sensing method of claim 13, wherein each of the transmit antenna patterns emits continuously modulated electromagnetic wave based on the modulated transmit signal.

15. The gesture sensing method of claim 14, wherein a frequency of the received signal is changed continuously based on the continuously modulated electromagnetic wave.

* * * * *